US012559206B2

(12) United States Patent
Benedict et al.

(10) Patent No.: US 12,559,206 B2
(45) Date of Patent: Feb. 24, 2026

(54) STORAGE AND DISTRIBUTION SYSTEM FOR CONTAINERS

(71) Applicant: BEC COMPANIES, INC., Tallahassee, FL (US)

(72) Inventors: Charles E. Benedict, Tallahassee, FL (US); Nicola Ianeselli, Miami, FL (US)

(73) Assignee: BEC COMPANIES, INC., Tallahassee, FL (US)

( * ) Notice: Subject to any disclaimer, the term of this patent is extended or adjusted under 35 U.S.C. 154(b) by 0 days.

(21) Appl. No.: 18/623,591

(22) Filed: Apr. 1, 2024

(65) Prior Publication Data

US 2024/0326956 A1 Oct. 3, 2024

Related U.S. Application Data

(60) Provisional application No. 63/455,858, filed on Mar. 30, 2023.

(51) Int. Cl.
| | |
|---|---|
| *B63B 27/12* | (2006.01) |
| *B63B 27/16* | (2006.01) |
| *B65G 1/04* | (2006.01) |
| *B63B 27/22* | (2006.01) |

(52) U.S. Cl.
CPC .............. *B63B 27/12* (2013.01); *B63B 27/16* (2013.01); *B65G 1/0464* (2013.01); *B65G 1/0478* (2013.01); *B63B 27/22* (2013.01)

(58) Field of Classification Search
CPC .... B65G 1/0464; B65G 1/0478; B65G 1/065; B65G 1/0457; B63B 27/12; B63B 27/16; B60L 2200/26; B60L 13/03; B61B 3/02; B61B 3/00; B66C 19/00; B66C 7/04
See application file for complete search history.

(56) References Cited

U.S. PATENT DOCUMENTS

| | | | | | |
|---|---|---|---|---|---|
| 3,853,068 | A | * | 12/1974 | Avery | ..................... B61C 13/04 |
| | | | | | 104/172.4 |
| 4,284,010 | A | * | 8/1981 | Marshall | ................. B60L 13/00 |
| | | | | | 105/155 |
| 5,156,093 | A | * | 10/1992 | Azukizawa | ............ B65G 54/02 |
| | | | | | 104/282 |
| 6,315,138 | B1 | * | 11/2001 | Dyson | .................. A61G 7/1051 |
| | | | | | 212/338 |
| 7,850,412 | B2 | * | 12/2010 | Benedict | ................. B63C 15/00 |
| | | | | | 414/281 |
| 7,931,431 | B2 | * | 4/2011 | Benedict | ................. B63B 25/22 |
| | | | | | 414/137.1 |

(Continued)

FOREIGN PATENT DOCUMENTS

| | | | | | |
|---|---|---|---|---|---|
| CN | 212243340 | U | * | 12/2020 | |
| DE | 102020005289 | A1 | * | 3/2022 | ........... B65G 67/603 |
| KR | 910002780 | B1 | * | 5/1991 | ............. E01B 25/30 |

*Primary Examiner* — Gregory W Adams
(74) *Attorney, Agent, or Firm* — DOWELL & DOWELL, P.C.

(57) ABSTRACT

A port storage and distribution system for facilitating the transfer and/or storage of international shipping containers between container ships and ground transport carriers wherein an overhead grid guide track structure is provided that permits overhead transfer units to selectively engage and convey containers as required between the various ships, carriers and storage area without requiring multiple transfers of containers between different handling equipment.

20 Claims, 19 Drawing Sheets

(56)           References Cited

U.S. PATENT DOCUMENTS

| | | | | |
|---|---|---|---|---|
| 8,206,074 | B2 * | 6/2012 | Benedict | .................. B66C 7/12 |
| | | | | 414/141.3 |
| 8,628,289 | B1 * | 1/2014 | Benedict | ............. B65G 1/0478 |
| | | | | 414/217 |
| 2002/0197135 | A1 * | 12/2002 | Arntzen | .................. B63B 27/19 |
| | | | | 414/140.3 |
| 2015/0048693 | A1 * | 2/2015 | Prussmeier | ............ H02K 11/33 |
| | | | | 310/12.09 |
| 2021/0114811 | A1 * | 4/2021 | Clark | .................. B65G 1/1378 |

* cited by examiner

94

86

89

93

97

91a 90          97a          92          91

81

6                    6

81

STORAGE AND DISTRIBUTION SYSTEM FOR CONTAINERS

BACKGROUND OF INVENTION

Field of Invention

This application is directed to a container storage and distribution system wherein containers are manipulated by one or more overhead transfer units (TU) that can lift or elevate the containers and maneuver them into vertical columns or stacks that are end to end and side by side, without the need to use conventional cranes, and the like, and in such a manner as to maximize storage space by eliminating the need for aisles or spaces between rows of containers for manipulating and/or handling equipment. The transfer units are driven along overhead guide tracks by one or more linear motors working in combination with one or more air bearings.

Brief Description of the Related Art

As known in the art, the containers are typically closed boxes such as used for overseas containers used for shipping goods via ships from one country to another, called ISO containers ranging from 20 feet long by nomically 8 feet wide including 40 feet and 45 feet long containers, as well as various sized containers to store vehicles, boats, self-storage containers of different sizes as well warehouse containers.

The transfer unit is equipped with hoists that are attached to the four corners of a spreader beam which adjust to fit the four corners of containers ranging from 20 feet long and 8 feet wide, 40 feet long by 8 feet wide and 45 feet long by 8 feet wide in a vertical arrangement with the lift cables (wire ropes) connected near or on the spreader beam four corners. The spreader is adjustable to fit the size of each container or frame.

U.S. Pat. Nos. 7,753,637 B2 and 8,206,074 B2 to Benedict et al. teaches a port storage and distribution system utilizing an overhead grid oriented in an X-Y pattern. The overhead grid includes hollow box beams oriented in the X-Y pattern. The transfer units travel along the hollow box beams via multiple carriage plates positioned within the box beams and secured to the transfer units.

U.S. Pat. No. 10,023,384 B2 to Benedict teaches an automated storage system utilizing an overhead grid oriented in an X-Y pattern. The overhead grid includes I-beams oriented in the X-Y pattern. The transfer units travel along lower flanges of the I-beams via multiple carriage plates positioned around the lower flanges of the I-beams and secured to the transfer units.

U.S. Pat. No. 10,829,303 B2 to Benedict teaches an automated storage system utilizing an overhead grid oriented in an X-Y pattern. The overhead grid includes T-beams oriented in the X-Y pattern. The transfer units travel along flanges of the T-beams via multiple carriage plates positioned around the flanges of the T-beams and secured to the transfer units.

The various patents referenced above have been granted addressing the features of overhead storage systems using box Beams, I-Beams and T-beams as rails used as the transport medium for an overhead track system to support a carriage within or on each rail configurations. In each reference, the transfer unit attaches to and moves along the rails via one or more carriage plates having a series of spherical ball bearings and unidirectional rollers attached to the underside of each carriage plate within the rail system. The carriage plates are attached to a transfer unit (TU) by a solid shaft through a slot in the lower surface of a box beam or around the edges of the flange of an I or T beam rail system arranged in an X-Y, or basically 90-degree configuration. The spherical ball bearings assist the carriage plates cross openings present at rail intersections along the X-Y rail system slots for the carriages attached to the top of the transfer unit.

However, the use of spherical ball bearings and unidirectional rollers, or similar mechanical means of movement, has drawbacks. The transfer units are constantly picking up and moving extremely heavy loads which quickly wear down any rollers or ball bearings used to move the transfer unit along the guide system. Maintenance downtime and associates' costs can add up quickly. With so many rollers in each carriage plate, the rails must be constantly kept clear as any debris on the rails could impair movement of the transfer units. Further, a simple X-Y configuration of the rail system causes logistic issues, as two transfer units cannot use the same rail and thus must be at least one cell apart at all times. It would be advantageous to reduce the time and cost of maintaining such automated container systems. Further, it would be advantageous to improve the efficiency of transfer unit movement along the X-Y grid system.

SUMMARY OF THE INVENTION

According to an embodiment of the invention, a shipping container port storage and transportation system has an overhead grid guide track structure including a plurality of box beams extending transversely with respect to one another in an intersecting pattern, at least one transfer unit moveably mounted to the grid guide track structure so as to be suspended from at least two spaced and parallel first box beams of the plurality of box beams when moving in a first direction and at least two spaced and parallel second box beams of the plurality of box beams when moving in a second direction transverse to the first direction, each transfer unit of said at least one transfer unit including a plurality of carriages for suspending the transfer unit from said at least two first and second parallel box beams, each carriage of the plurality of carriages being an air bearing that lifts the transfer unit relative to the plurality of box beams, and a linear motor system having a stator and at least one rotor, the stator extending throughout the plurality of box beams, and a rotor of said at least one rotor attached to each carriage means of each said transfer unit, the linear motor system configured to move each transfer unit of said at least one transfer unit along said plurality of box beams of said grid guide track system so as to be moveable in a horizontal plane in both forward to back and side to side motions within the plane.

According to another embodiment of the invention, a transfer unit has a frame having a plurality shafts, each shaft of the plurality shafts extending vertically and attached to an air bearing carriage; one or more air compressors secured to the frame; one or more hoist motors secured to the frame; one or more winding drums connected to and rotatable by the one or more hoist motors; a cable attached to each winding drum of the one or more winding drums, the cable extendable and retractable relative to the frame; and a spreader beam secured to the cable of said each winding drum; wherein the air bearing carriage is connected to an air compressor of said one or more air compressors, the air bearing carriage having a bearing housing with a plurality of openings along a bottom surface of the bearing housing, the air compressor configured to supply pressurized air to the bearing housing via a corresponding shaft of the plurality of shafts such that the pressurized air is forced out of the plurality of openings According to yet another embodiment of the invention, an air bearing carriage has a carriage housing having an upper surface and a lower surface, the carriage housing attachable to a shaft along at least the lower surface; a raised lip along a periphery of the lower surface, the raised lip extending downwardly and way from the lower surface; a plurality of air pad surfaces along the lower surface and within the raised lip, each air pad surface of the plurality of air pad surfaces having a plurality of holes; and a plurality of solid surfaces having no holes, a solid surface of the plurality of solid surfaces positioned between adjacent air pad surfaces, wherein the plurality of holes are fluidly connected through the carriage housing to the shaft such that air may be passed through the shaft, through the housing, and out through the plurality of holes.

BRIEF DESCRIPTION OF THE DRAWINGS

A better understanding of the invention will be had with reference to the attached drawings wherein.

DESCRIPTION OF PREFERRED EMBODIMENTS

With continued reference to the drawings, automated container transportation systems will be described wherein air bearings are used to lift transfer units relative to railing and linear motors are used to propel the transfer units along the railing of an overhead guide railing system. Several embodiments of the invention will be described.

Figure 1:
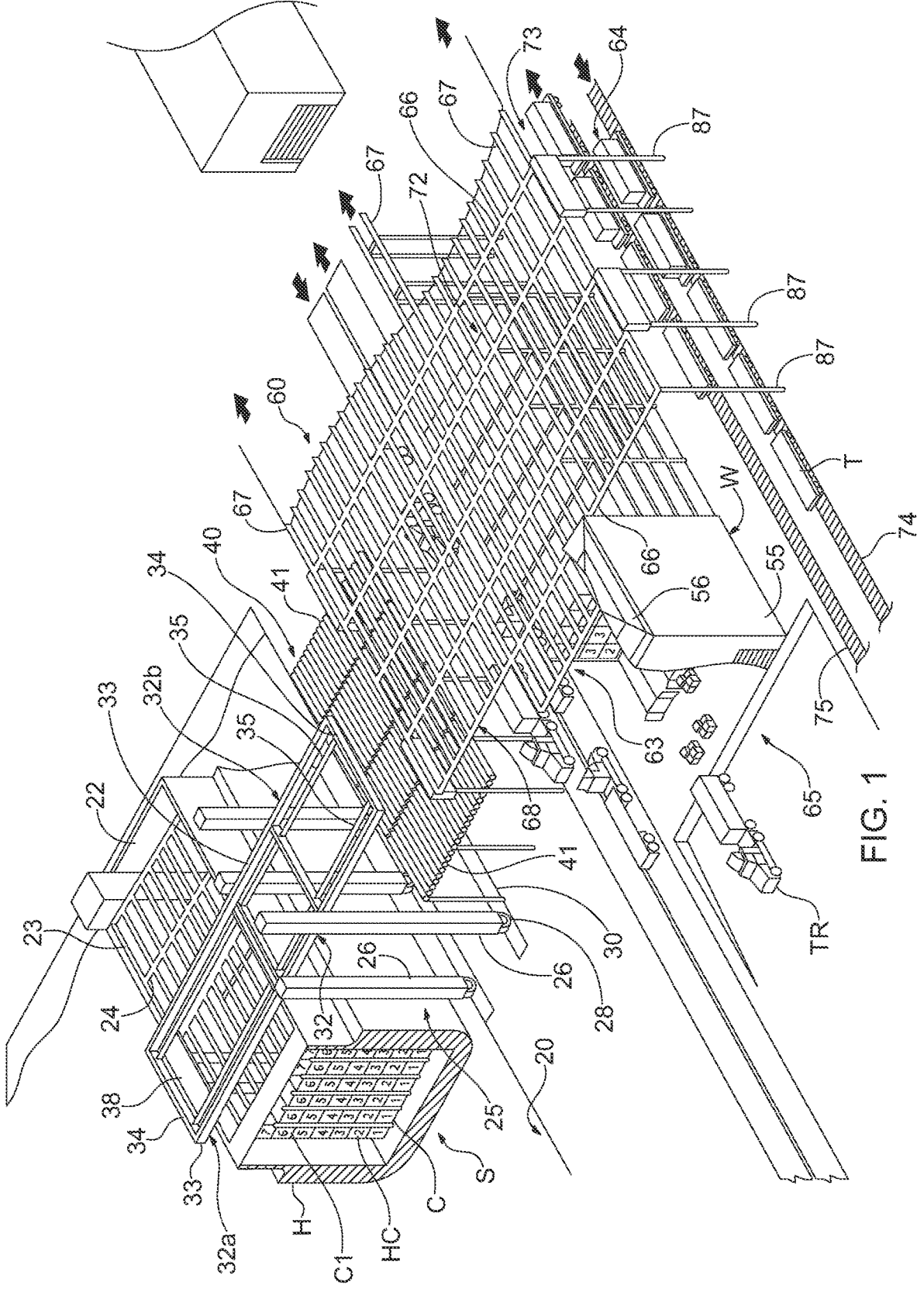
FIG. 1 is a perspective view of an embodiment of a shipping container port storage and transportation system in accordance with the teachings of the present invention, illustrating the transfer of a shipping container from a container ship to an elevated transfer platform on which the container is placed so as to be subsequently engaged by an overhead transfer vehicle or unit to be moved within the system to either be stored, placed on a ground carrier for transport, or transferred to another container ship.

A first embodiment of port facility is shown in FIG. 1 as including a docking berth area 20 for a container ship S. A container ship is a specialized vessel which is specifically designed to maximize the storage capacity of international storage and shipping containers C. Conventional container ships S include one or more hold areas extending from a bow to a stern of the ship with each hold area being divided into a plurality of vertically tiered cells. Only a section through the hull H of the ship S is shown in FIG. 1 in which a plurality of vertical holding cells HC are formed. The cells are open vertically and are defined by generally V-shaped steel guideposts which are positioned at the four corners of each cell. The steel guideposts are spaced in such a manner that conventionally dimensioned international shipping containers C may be positively guided when being lowered into or being raised within the cells. In this manner the containers may be stacked one upon another within each cell. Typical cells may retain as many as six or more stacked containers.

Each hold 22 is shown as being reinforced by a plurality of fore and aft extending steel beams 23 and starboard to port extending beams 24 each of which is constructed to coincide with the cells HC. This grid structure is sealed utilizing conventional hatch covers, not shown, which are removably mounted in a conventional manner to the structure. As further shown in FIG. 1, there are typically seven storage tiers 1 through 7 in each cell of the hold area and, further, there are shown, seven cells in width between the starboard and port side of the ship=s hull with only six being visible in the drawing figure.

Preferably, the first six tier levels are completely filled with storage containers C as is illustrated in FIGS. 1, however, approximately half of the seventh tier 7 of each of the cells are left vacant or empty upon the initial loading of the vessel in order to allow for storage containers C to be shuffled within the cells of the vessel. A container located on the sixth tier may be elevated and placed in the seventh tier of one of the cells and, in like manner, the underlying container in the fifth tier may also be raised and placed in an empty seventh tier of another cell. In this manner, access can be obtained to any of the containers within a cell without requiring that the containers be elevated out of the hold area of the ship.

Once a desired container such as shown at $C_1$ in FIG. 1 is exposed, the container may be elevated and discharged from the ship by use of a gantry crane 25 that is disposed along the dock to be movable relative to the ship=s hold. As opposed to using a shore-based gantry crane, in some instances it may be possible to use one or more conventional ships cranes utilizing conventional hoist line equipment, not shown, to elevate containers from the storage cells and move them toward the on-shore handling equipment of the present invention.

As further shown in FIG. 1, the gantry crane 25 includes four support legs 26 that are mounted to rollers or wheels 28 such that the crane may be moved along guide tracks 30 to adjust the positioning of the crane relative to the ship. The gantry crane 25 also has a boom comprised of horizontal support frame 32 having elongated beams 33 connected by transverse reinforcing beams 34, along with a pair of spaced and parallel guide tracks or rails 35 that are carried by the frame 32. A first portion 32a of the frame and guide tracks are cantilevered over the hold of the ship such that a hoisting vehicle 38 suspended from or otherwise movable along the tracks 35 may be maneuvered over the hold cells HC. A second portion 32b of the frame is cantilevered in a direction opposite the first portion over an elevated receiving transfer platform 40 being an elevated surface for receiving containers. The transfer platform may include a surface being a series of roller conveyors 41. In this manner, after a container C1 has been removed from the storage hold of the ship using the hoisting vehicle 38, the hoisting vehicle moves under its own power from the outer or first portion of the frame 32a to the inner or second portion 32b of the frame so that the container may be lowered to one of the roller conveyors 41 or a transfer platform vehicle 42 of a transfer platform 40. After being released from the hoisting vehicle 38 onto a platform 40 with roller conveyors 41, the containers automatically move toward an inner transfer section of the platform 40 to be positioned to be selectively engaged and moved by at least one overhead transfer unit or vehicle 62, see FIG. 2

With continuing reference to FIG. 1, the port area of the present invention is specifically designed to permit immediate transfer of shipping containers between container ships and conventional land-based means of transportation such as trains T and trucks TR or between outside temporary or longer storage areas such as one or more warehouse structures W with no more than one transfer point.

Further embodiments contemplate the transfer of shipping containers from one container ship to another container ship. In such an embodiment, containers C would be moved off the ship S via crane, onto the platform 40 for pickup by the transfer vehicle 62, and then deposited onto another platform 40 corresponding to another ship for pickup by another crane, the second platform, crane, and ship not shown.

In some embodiments, one or more warehouses may be enclosed by side walls 55 covered by a roof 56. In the drawings, most of the walls and roof are removed to show the storage area and cells within the warehouse. In some other embodiments, the storage areas may be open and not enclosed be roofing or walls.

Figure 17:
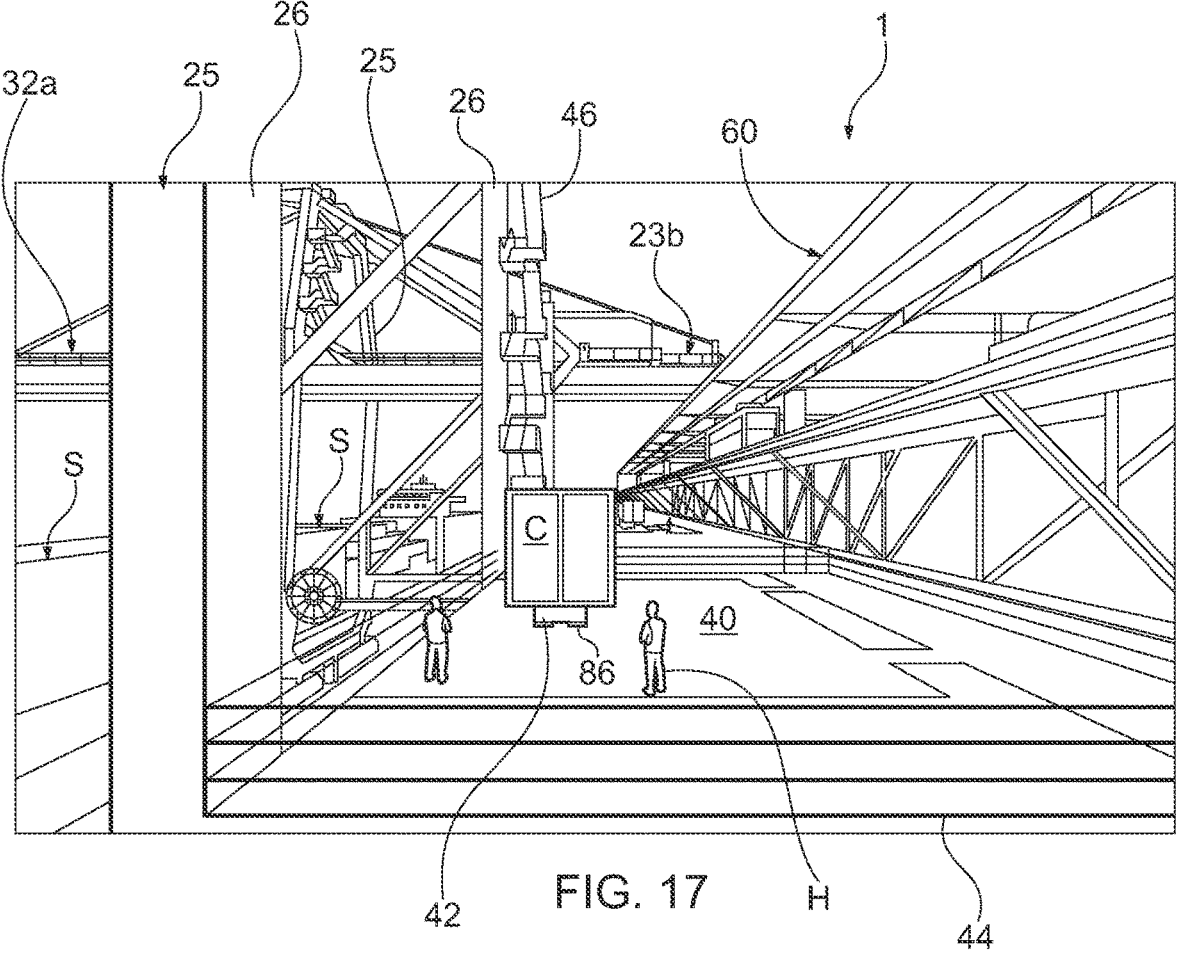
FIG. 17 is a perspective of a representative container placed on top of a transfer platform vehicle movable on the transfer platform from a port crane.

As shown in FIG. 17, a gantry crane 25 modified according to an embodiment of the present invention includes an elevated transfer platform 40 horizontally extending away from the back of the gantry crane's rearward vertical supports 26. The gantry crane 25 typically includes four vertical supports 26 being support legs that are mounted to rollers or wheels 28, such that the gantry crane may be moved along guide tracks 30 to adjust the positioning of the gantry crane relative to the ship S. The gantry crane 25 also includes a horizontally oriented boom secured to the vertical supports 32 and positioned above the transfer platform 40. An attachment mechanism, not shown, is secured to the boom for attaching to the containers C. This attachment mechanism, typically a spreader beam 110, is secured to the boom via cables and is vertically movable up and down relative to the boom. The attachment mechanism is also horizontally moveable relative to the boom between a ship end and a port end of the boom. In operation, the attachment mechanism descends downwardly from the boom at the ship end 22, attaches to container C located on the container ship S, is retracted upwardly toward the boom, moves horizontally toward the port end until over the transfer platform 40, descends downwardly to place the container on a transfer platform vehicle 42 on the transfer platform or the roller conveyors 41, is retracted upwards toward the boom, and then moves horizontally back toward the ship end 22 to begin the process over.

The transfer platform 40 preferably has safety railing 44 around a perimeter of the platform, as well as access means 46, being stairs, a ladder, elevator, etc., for human operators (H) to access the platform and safely work atop the platform. Once the container is positioned and/or secured on top of the transfer platform vehicle 42, the operators work on the platform 40 to release the twist locks on the bottom of the container (C) from the receptacle mechanism. The transfer platform vehicle 42 then moves the container to a position underneath an end cell opening of the overhead guide track system 60 for pickup by a transfer unit 62. Preferably, the movement of the container across the transfer platform 40 to the position under an end cell opening is automated, as will be explained further herein. The transfer platform vehicle 42 may include a plurality of air bearings, wheels, or rollers on the bottom surface for moving it and the container across the transfer platform 40. Preferably, the transfer platform vehicle 42 has one or more air-bearing carriages 86 on a bottom surface of the vehicle, as described further herein, for lifting the transfer platform vehicle and container upwards relative to the transfer platform 40 via pressurized air, in addition to the stated means for lateral movement, i.e. motorized wheels, rollers, or linear motor system. The transfer platform vehicle 42 is appropriately shaped to safely hold and move a container C on the transfer platform 40 and may include mechanisms for securing the container to the transfer platform vehicle beyond simply the weight of the container.

Figure 18:
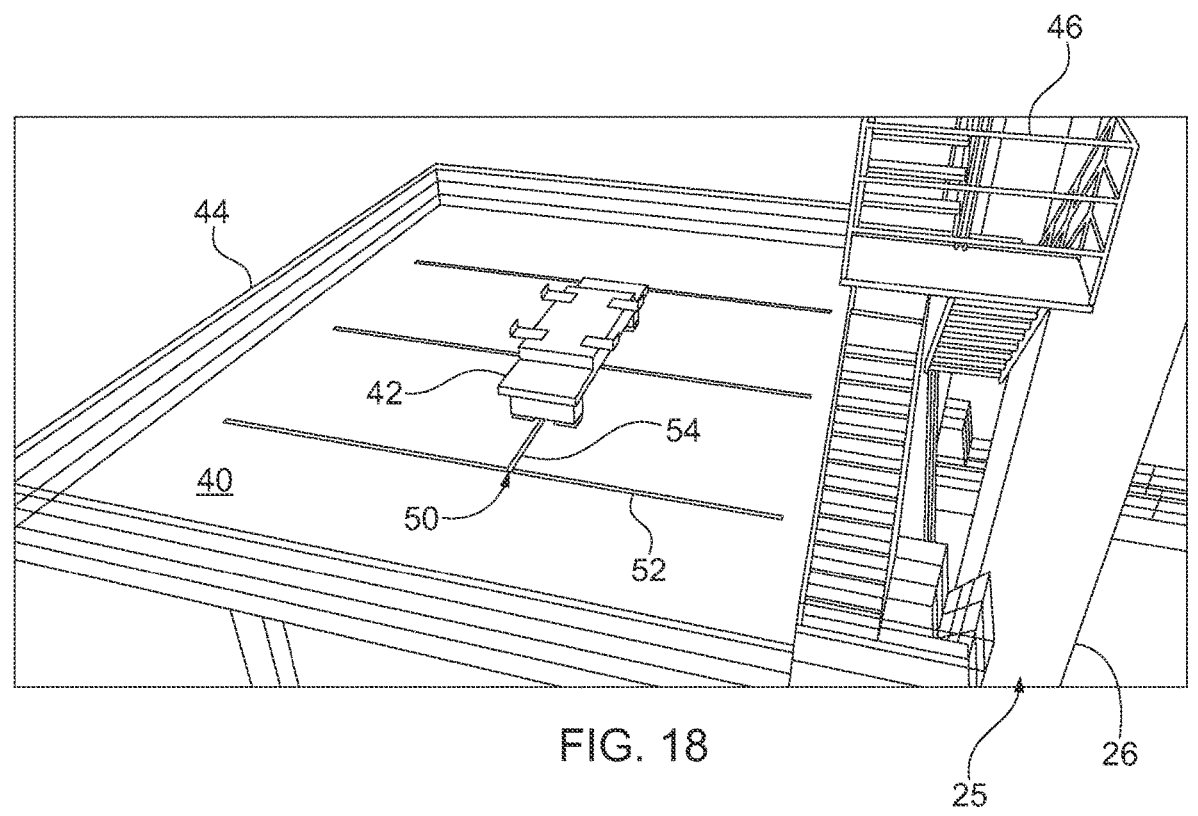
FIG. 18 is a perspective view of an alternate embodiment of the transfer platform and transfer platform vehicle of FIG. 17.
Figure 19:
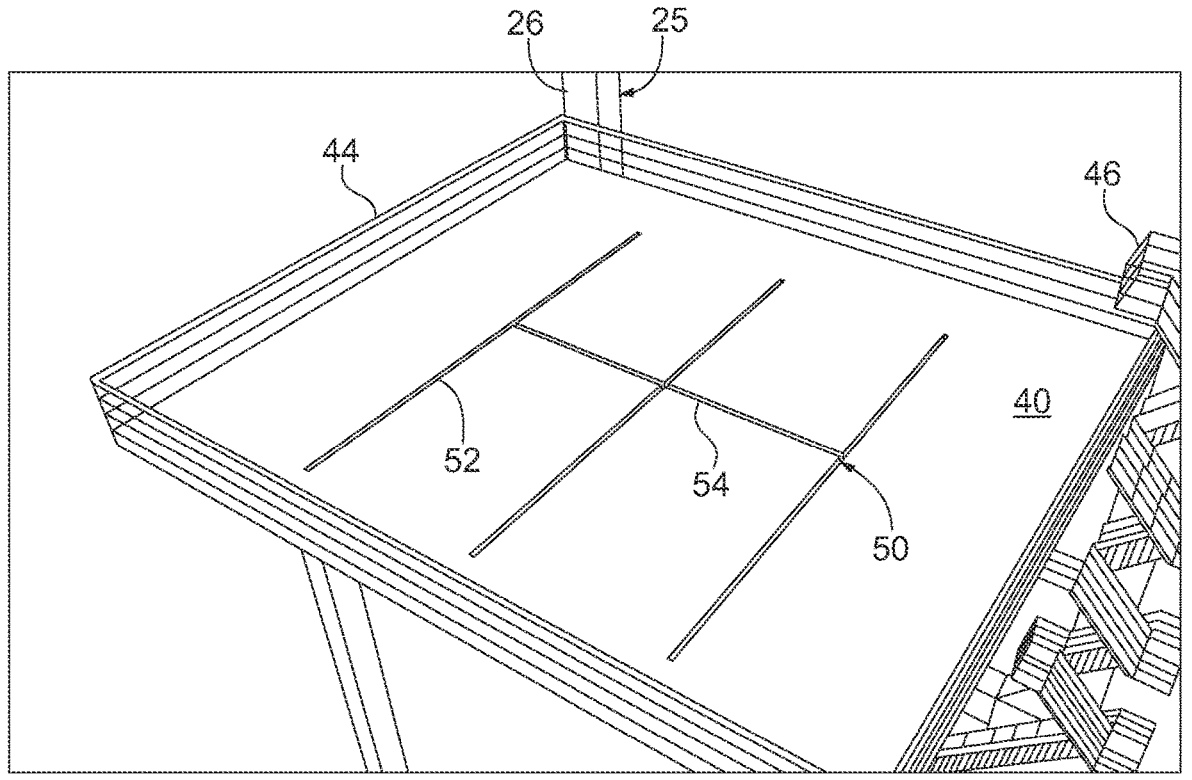
FIG. 19 is a perspective view of the transfer platform embodiment of FIG. 18 without the transfer platform vehicle.

In an embodiment shown in FIGS. 18 and 19, the transfer platform vehicle 42 may be powered through electrical rails 50 located directly under the surface of the transfer platform 40, and electrically accessible to an electrical contact extending from a bottom of the transfer platform vehicle. The electrical rails are there to power the air compressors and/or motorized wheels on the transfer platform vehicle via the electrical contact, not shown. The preferable means to drive the transfer platform vehicle is using electrically or pneumatically driven wheels, not shown, located at each corner of the transfer platform vehicle. Air compressors, not shown, supply pressurized air to air bearings on the transfer platform vehicle 42, which lifts the transfer platform vehicle off the transfer platform 40. The electrical rails 50 may be configured in a variety of layouts or configurations. As shown in FIGS. 18 and 19, the electrical rails 50 are configured in an X-Y configuration with X-configured rails 52 perpendicularly intersecting or touching a Y-configured rail 54. There may be multiple Y-configured rails 54, and there may be more or less X-configured rails 52 than shown.

The transfer platform 40 may be directly attached to the gantry crane 25, as shown in FIGS. 17, 18, and 19. Alternatively, the transfer platform 40 may be separate from and moveable in relation to the gantry crane 25. Both configurations of the transfer platform 40, attached or separate from the gantry crane 25, are compatible with the embodiments of the transfer platform shown in FIGS. 17, 18, and 19.

The overhead grid guide track or rail system 60 of the present invention is designed to efficiently and effectively move containers C between all desired locations in a terminal or port setting. The guide track system 60 can be as high as the containers can be stacked and cover an entire storage area to store as many containers as an area can accommodate. As an example, 3,673 forty-foot containers can be stored on four acres, stacked seven containers high, or 4,198 stacked eight containers high. This is based on approximately 8 feet×40 feet containers (8 feet wide×40 feet long) with other configurations yielding different numbers.

The overhead grid guide track system 60, or grid system, is specifically designed to permit the simultaneous movement of a plurality of the transfer vehicles or units 62 between the elevated receiving platform 40, the warehouse(s) W or the open storage area(s) 72, a truck loading/unloading area 63, a railway loading/unloading area 64 and, additional storage areas or warehouses 65, or a second ship. To accomplish this, the overhead grid guide track system includes a plurality of parallel rails 66 that extend inwardly of the dock side that intersect with a plurality of transversely oriented and parallel rails 67. The structure of rails 66 and 67 will be described in greater detail hereinafter. Because of the intersecting rails 66 and 67, the transfer units 62 can move in an X-Y plane to maneuver shipping containers between the various modes of transportation and the storage areas and warehouses. In essence, the entire container storage area can be covered by the grid system 60 so the transfer units 62 can traverse the entire storage area. A four-acre storage area can accommodate twenty or more transfer units 62. As the demand for more container movement speed increases, more transfer units 62 can be added to the grid system 60.

Figure 15:
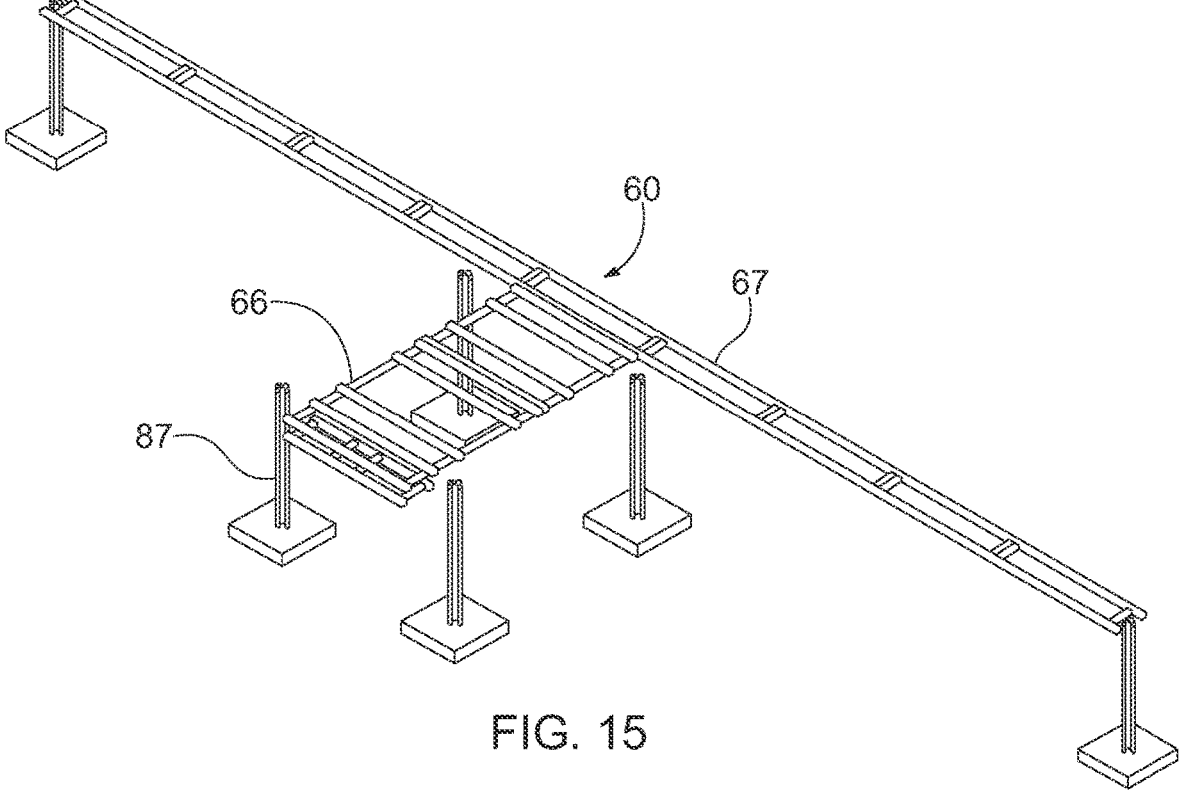
FIG. 15 is a top perspective view of an intermediary section of the overhead guide track system according to an embodiment of the invention.

Moreover, the coverage or footprint of the guide track system 60 may vary to fit the needs of the terminal. For instance, sections of rails 66, 67 may be designed to connect different, larger areas of rails 66, 67, such as shown in FIG. 15. The guide track system 60 of FIG. 15 is designed in such a way that the transfer unit 62 may easily deposit containers C onto trains T or trucks TC, or even onto a platform 40, and also connect two or more larger grid system 60 sections.

Figure 8:
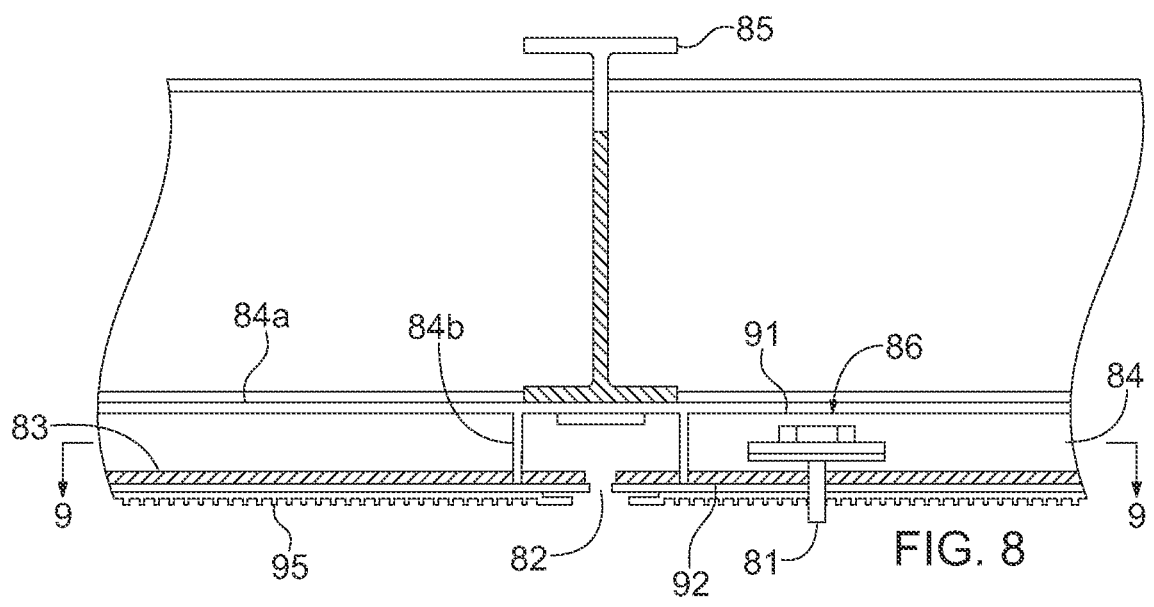
FIG. 8 is a cross-sectional view along plane C shown in FIG. 9 of the overhead guide tracks along an intersection with the air bearing system of FIG. 5 secured within the guide tracks.
Figure 12:
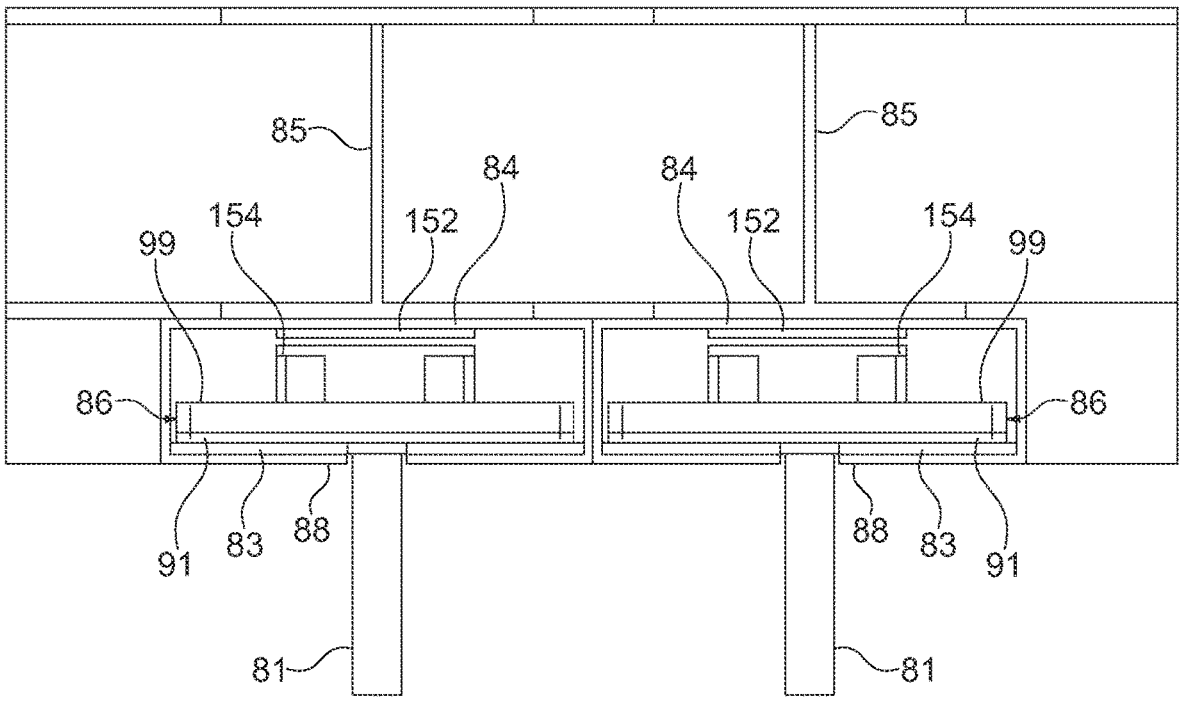
FIG. 12 is a cross-sectional view along a double railing section of the overhead guide tracks.

The grid guide track system 60 is formed by a plurality of hollow steel box beams 84 that are bolted, welded or otherwise secured to steel girders or roofing AI@ beams 85, see FIG. 8, so that the open slots 82 in the box beams 84 are downwardly oriented. The beams 85 are supported by steel columns or posts 87, see FIG. 12. The grid system 60 extends above the periphery of each of the underlying imaginary or real storage cells within the storage area 72 of the system in such a manner that the transfer units 62 may be directly and selectively aligned above the cells so as to place a shipping container into a cell space or elevate a container from a cell space. Load bearing flanges 88 are formed on opposite sides of the slots 82 on which air bearing carriages 86 are movably supported. Each of the pilot hanger shafts 81 is centrally secured to an air bearing carriage 86 and extends through the slots 82 and into the hollow box beams 84.

Figure 2:
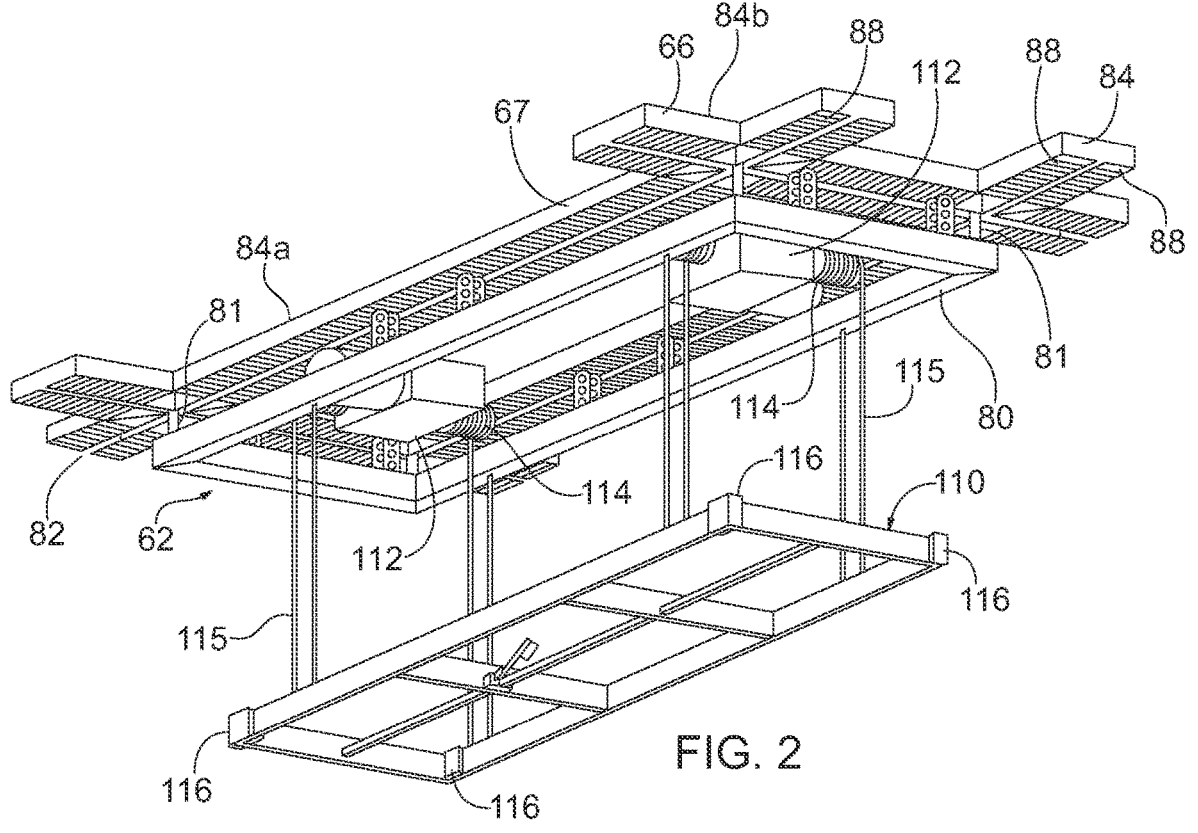
FIG. 2 is a perspective view of an overhead transfer unit shown along a portion of an overhead guide system according to an embodiment of the invention.

One embodiment of the transfer unit 62 is shown in FIG. 2 secured to railing 66, 67 of the guide track system 60. The transfer unit 62 includes a body having upper and lower surfaces, which in the embodiment shown, includes a rectangular frame 80 that is made of steel or other appropriate material that may be covered by steel sheet metal along the upper and side surfaces. The frame 80 is supported at each of the four corners thereof by support or pilot hanger shafts 81 that extend upwardly from the frame and through open slots 82 that are provided in the guide track system 60. Each pilot hangar shaft 81 is preferably as short as possible to reduce sheering strain but allows for adequate clearance between the transfer unit 62 and guide track system 60. The longer the pilot hangar shafts 81 are, the more shear force acts on them with sudden stops and starts of the transfer unit 62.

Figure 3A:
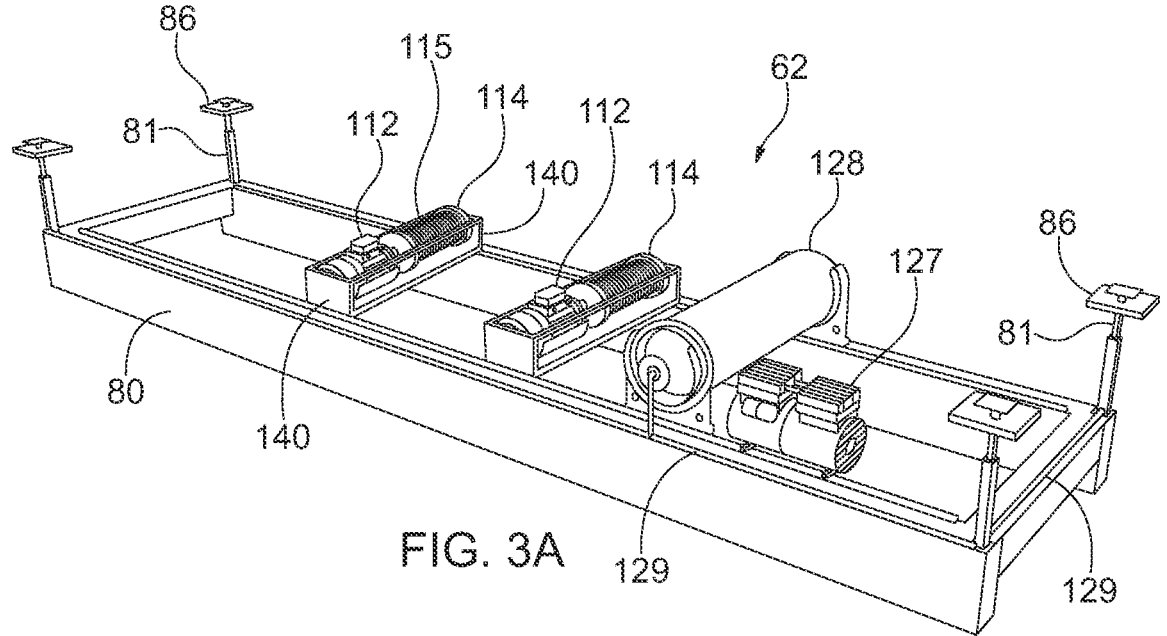
FIG. 3A is a perspective view of an alternate embodiment of the overhead transfer unit having an air compressor for supplying pressurized air to air bearings.
Figure 3B:
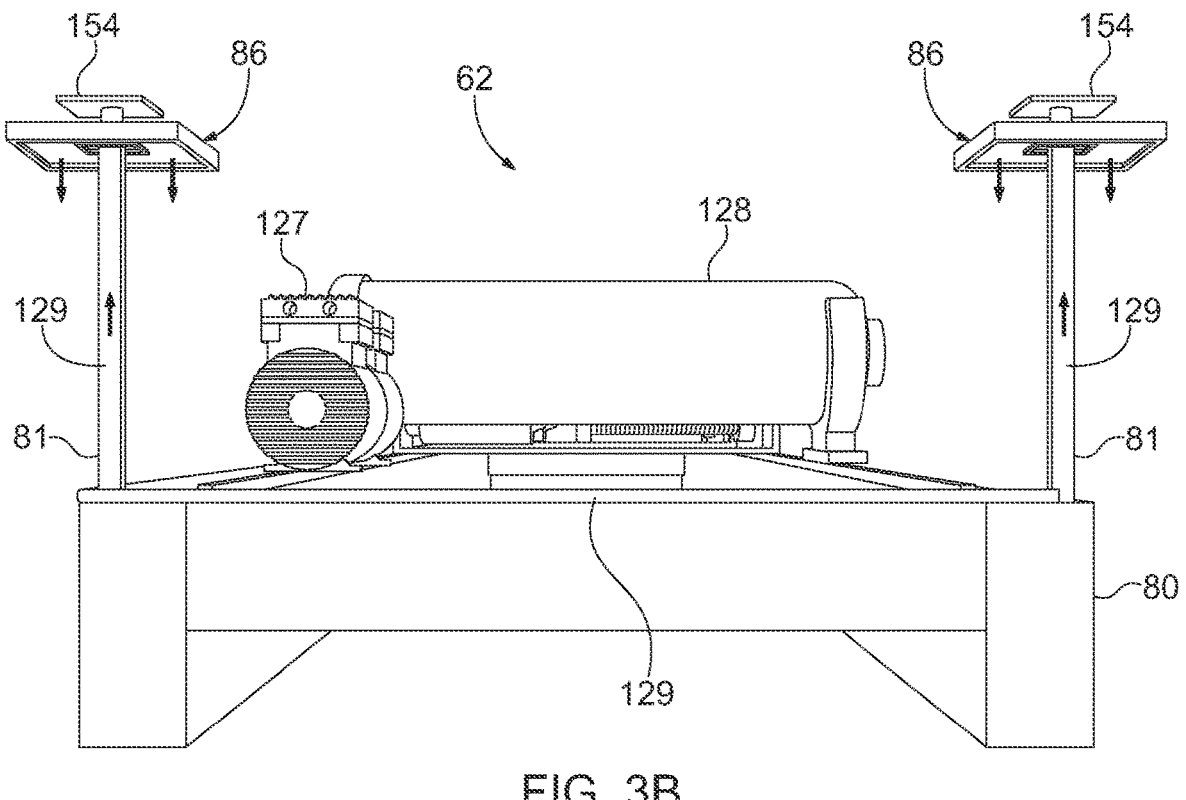
FIG. 3B is a side view of the transfer unit of FIG. 3A.
Figure 4:
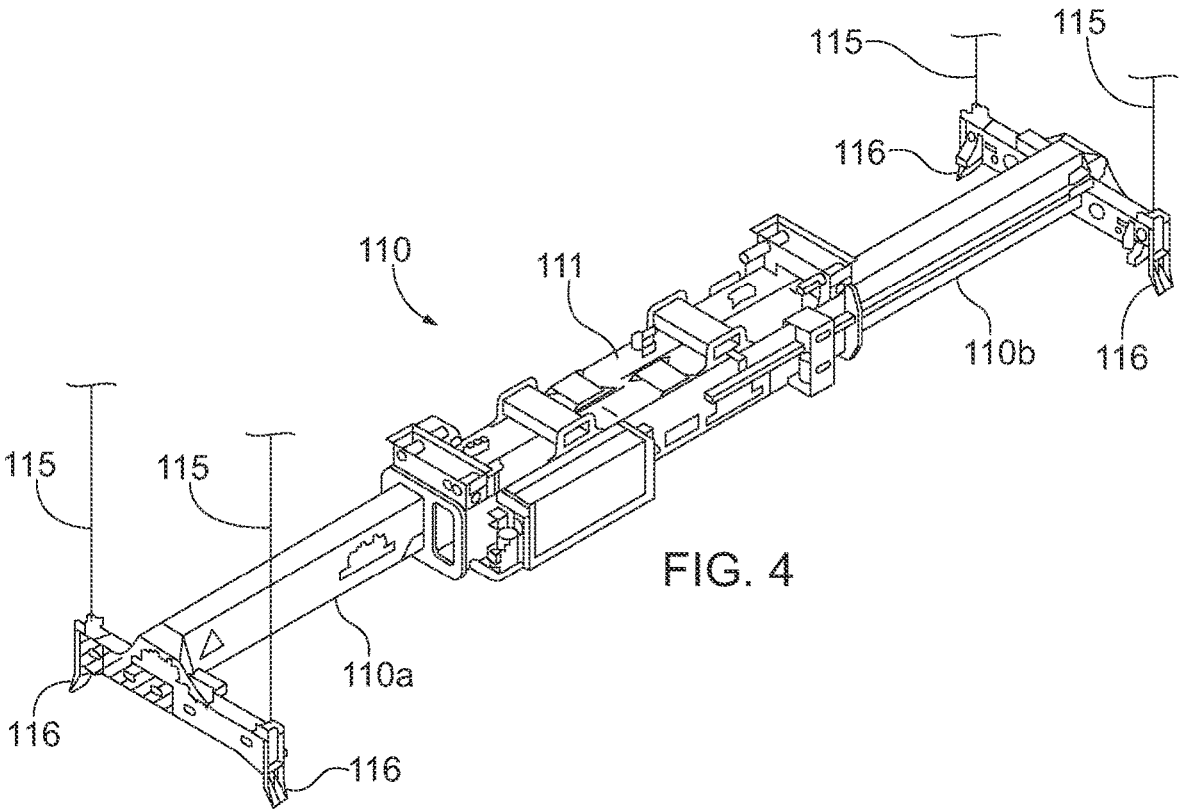
FIG. 4 is a perspective view of a spreader beam embodiment attachable to a transfer unit of the present invention.

Another embodiment of the transfer unit 62 is shown in FIGS. 3A and 3B to show features of the present invention more clearly. To control the vertical movement of a spreader beam 110 attached to cables or hoist cables 115, one or more hoist motors 112 are mounted to the frame 80 of the transfer unit 62. Two hoist motors are provided in the embodiment shown in FIG. 3A. The outputs from these motors are connected through power splitters 113 to one or more winding drums 114, which may include a pair of winding drums 114. The cables 115, as shown in FIGS. 2 and 4, extend from the winding drums 114 to lower ends that are fixed and/or secured to the spreader beam 110. As the spreader beam 110 is lowered toward an underlying shipping container C, by activation of the motors 112, the spreader beam will engage about the upper periphery of the shipping container, after which, locking mechanisms 116 located about each corner are automatically tripped to engage the lock boxes of the containers such that the shipping container can be elevated to a position immediately adjacent the transfer unit 62. In this position, the transfer unit 62 can be moved along the railing 66, 67 to move shipping containers as desired.

A spreader beam 110 is attached to cables 115, which in turn are secured to one or more winding drums 114 powered by one or more hoist motors 112, a winding drum and a hoist motor collectively referred to as a hoist. The cables 115 may further include a pulley system, not shown, having sheaves lined up to a center of each winding drum 114 to maintain vertical. Maintaining vertical, as referred to in this disclosure, means that each set of cables 115 does not create an angle off 90 degrees between the cable and a corresponding and the spreader beam 110 or container C when lifting, moving, or depositing a container. Likewise, the cable 115 should maintain 90 degrees between the cable and the frame 80. Both the winding drums 114 and the hoist motor 112 are preferably mounted to a shuttle 140 which frames and houses the winding drums 114 and hoist motor 112. Together, the shuttle forms a hoist and motor system with its housed winding drums and hoist motors. The shuttle 140 can be an open frame structure or have one or more closed sides. Typically, one hoist motor 112 and two winding drums 114 are provided and secured within one shuttle, with a shuttle provided for each of the two ends of the spreader beam 110. Other numbers and configurations of those structures are possible based on container weight, safety, and power requirements. Further, the shuttles 140 may be positioned on top of or within frame 80. The shuttles 140 are shown on top of the frame 80 in FIG. 3A, and the shuttles are shown within and between the frame 80 in FIGS. 16A and 16B.

Figure 16A:
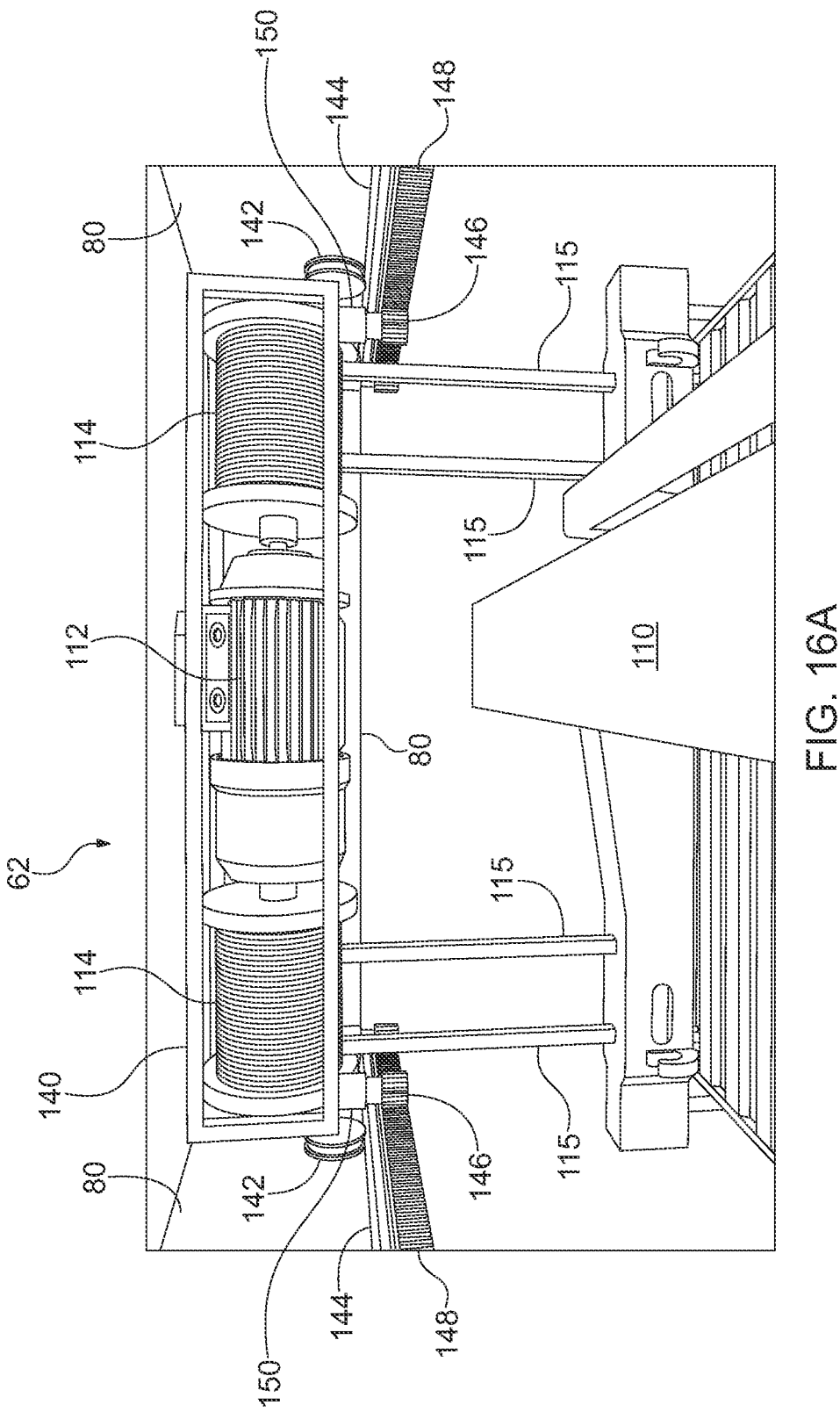
FIG. 16A is an inner end view of another embodiment of the overhead transfer unit showing a shuttle housing a hoist and motor system of the overhead transfer unit.
Figure 16B:
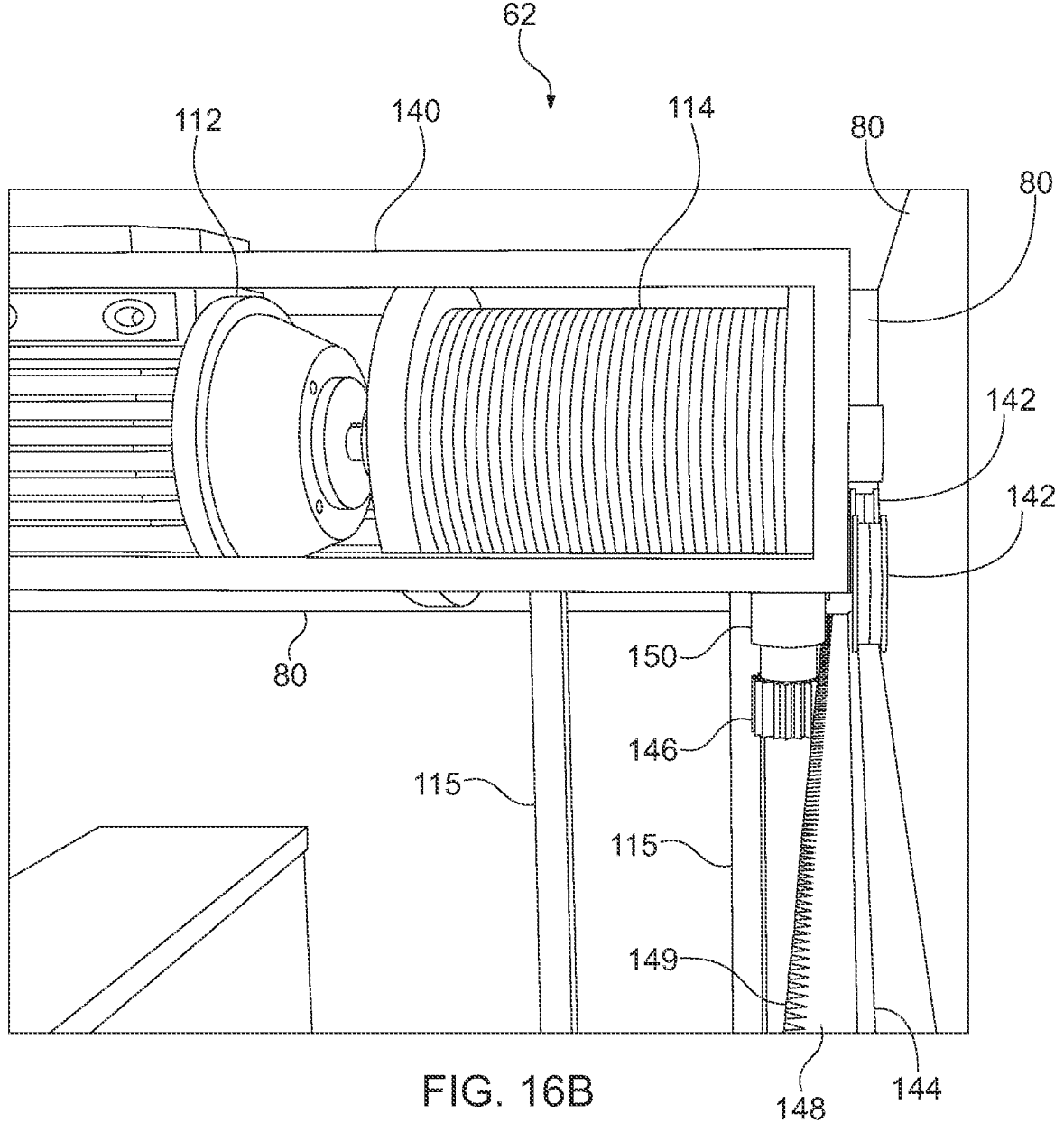
FIG. 16B is a further end view of the shuttle of FIG. 16B secured along a rack and pinion system.

Additionally, the transfer unit 62 may include a rack and pinion system to stabilize and secure the shuttles 140. As shown in FIGS. 16A and 16B, multiple pinions 146 are attached to each shuttle 140, each pinion attached to the shuttle by a pinion housing 150. A motor, not shown, is preferably provided and housed within each pinion housing 150 to drive and cause the corresponding pinion to rotate. Preferably, the pinions 146 and pinion housings 150 extend downwardly from the shuttle 140. However, the pinions 146 and racks 148 may be otherwise oriented in such a way that they still both interact with each other in a manner to move the shuttle along a length of the rack relative to the transfer unit 62. A rack 148 is provided along a length of the frame 80, and preferably an entire inner length, on each of two opposing sides of the frame. The rack 148 has teeth 149 along an inner surface corresponding to teeth of the pinions 146. In operation, each pinion 146 has teeth that engage an adjacent rack 148 along respective teeth 149 of the rack, and the pinion motors, not shown, inside the pinion housing 150 act to rotate the pinions against the racks and move the shuttle 140 back and forth along a length of the transfer unit 62.

Multiple rollers 142 are also attached to the shuttle 140, preferably at least one roller attached along each of two opposing ends of the shuttle. A guide track 144 is provided along a length, and preferably an entire inner length being the same as the rack 148, of the frame 102 along opposing sides of the frame. The rollers 142 are configured to be secured to the guide track 144 and rotationally translate along a length of the guide track, which in turn allows the shuttle 140 to move back and forth along the guide track and rack 148. Preferably, each roller 142 has lips defining a central groove around the circumference of the roller. When secured to the guide track 144, the guide track fits within the groove of the roller 142 and the lips of each roller oriented on opposing sides of the guide track. The rollers 142 further provide vertical support to the shuttle 140 to prevent the shuttle from being pulled downward off the guide track 144 and rack 148. The racks 148 and pinions 146 provide horizontal support and help keep the rollers 142 aligned on respective tracks 144. The rollers 142 especially must be capable of withstanding a substantial load when containers C are secured to the spreader beam 110, and are made with materials and in a manner as known in the art.

In operation, the shuttles 140 preferably move laterally and in unison with the ends of the spreader beam 110 ensure that the cables 115 maintain vertical. In other words, shuttles 140 move to ensure that the cables 115 perpendicular to the spreader beam 110 and container across one or more axes, as the spreader beam 110 can expand and contract in length to secure containers C of varying lengths. Otherwise, the cables 115 experience additional strain forces that can jeopardize the safety of the container C and the transfer unit 62. Further, sensors, not shown, may be attached or in communication with the winding drums 114, hoist motors 112, and/or cables 115 to detect and automatically adjust tension in the cables to achieve a tension balance when a container C attached to the spreader beam 110 has an unevenly distributed load.

The transfer unit 62 also includes one or more air compressors 127 and air tanks 128 to supply pressurized air to the air bearing carriages 86. In FIG. 3A, one air compressor 127 and one air tank 128 is shown secured to the frame 80 of the transfer unit 62. Each air compressor 127 and air tank 128 is secured to an air supply line 129 which is further secured to and/or extends through the pilot hangar shaft 81 to operably connect to the hollow housing 89 of the air bearing carriage 86. As explained further herein, the air compressor 127 supplies pressurized air to the air bearing carriage 86 to lift the transfer unit 62 up off of flanges 88 for lateral movement along the guide track system 60.

Power to the motors 112, air compressor 127, and other devices associated with each of the transfer units 62 may be provided by onboard rechargeable batteries, not shown. The hoist motors 112 may be two 75 horsepower motors. The hoists, being the winding drum 114 with attached cable 115 and corresponding hoist motor 112, may lift fully loaded containers at a rate of up to approximately 75 feet per minute and may operate at up to 112 feet per minute with no load.

Each transfer unit 62 is designed to raise and lower at least one shipping container C via a spreader beam 110 having locking mechanisms 116, the spreader beam suspended from, and vertically movable by, cables 115 via sheaves (not shown) attached at each of the four corners of the spreader beam 110. The cables 115 are secured to winding drums 114 mounted on the frame 80 or in a shuttle 140. One end of each cable 115 is attached to a winding drum 114. Each cable 115 passes around each sheave and goes back up, vertically, to a hoist. There is a hoist for each cable 115 at each corner of the spreader beam 110. When the transfer unit 62 picks up a container C with the spreader beam 110, the spreader beam is pulled up to the transfer unit 62 and is locked underneath the transfer unit. When the spreader beam 110 is empty and the transfer unit 62 moves, the spreader beam 110 is pulled up and locked to the transfer unit.

FIG. 4 shows a preferred spreader beam 110 with cables 115 secured about its four corners. The spreader beam 110 is designed to automatically lock to a corresponding shipping container with the locking mechanisms 116, one locking mechanism preferably located at each corner and/or end of the spreader beam and being compatible with all conventional shipping containers. The spreader beam 110 may be expandable to be usable to lift both 20-foot, 40-foot and 45-foot containers. The spreader beam 110 may include movable portions 110a and 110b, to allow a shortening or lengthening of the spreader beam to accommodate containers C with different lengths. The portions 110a and 110b may telescope within each other or within a central portion 111 of the spreader beam.

In embodiments of the transfer unit without the movable shuttles 140, there may be a trolley under the transfer unit 62 that is centered to pick up 40-foot containers. The trolley can move left or right or stay centered to pick up 20-foot containers depending on how they are positioned with the spreader beam 110 in the 20-foot orientation. The transfer unit 62 centers the 20-foot container when it picks it up and clamps the spreader beam 110 and container C to move it. When the transfer unit 62 reaches the desired storage space, the trolley moves the spreader beam 110 and 20-foot container either left or right 10 feet so the 20-foot container is positioned to fit within the left or right half of a 40-foot space.

Preferably, the locking mechanisms 116 are located on spreader beam 110 at each of four corners of the spreader beam as shown in FIGS. 2 and 4. The locking mechanism is preferably of the twist lock type. Other types of conventional locking mechanisms for safely and securely attaching the spreader beam 110 to a shipping container may be used. Further, the spreader beam 110 may include remote controlled cam locks for the containers.

Figures 5, 6:
FIG. 5 is a perspective view of an air bearing system of the transfer unit of FIG. 3A.
FIG. 6 is a cross-sectional view along plane A-A of a shaft attached to the air bearing system of FIG. 5.
Figure 7:
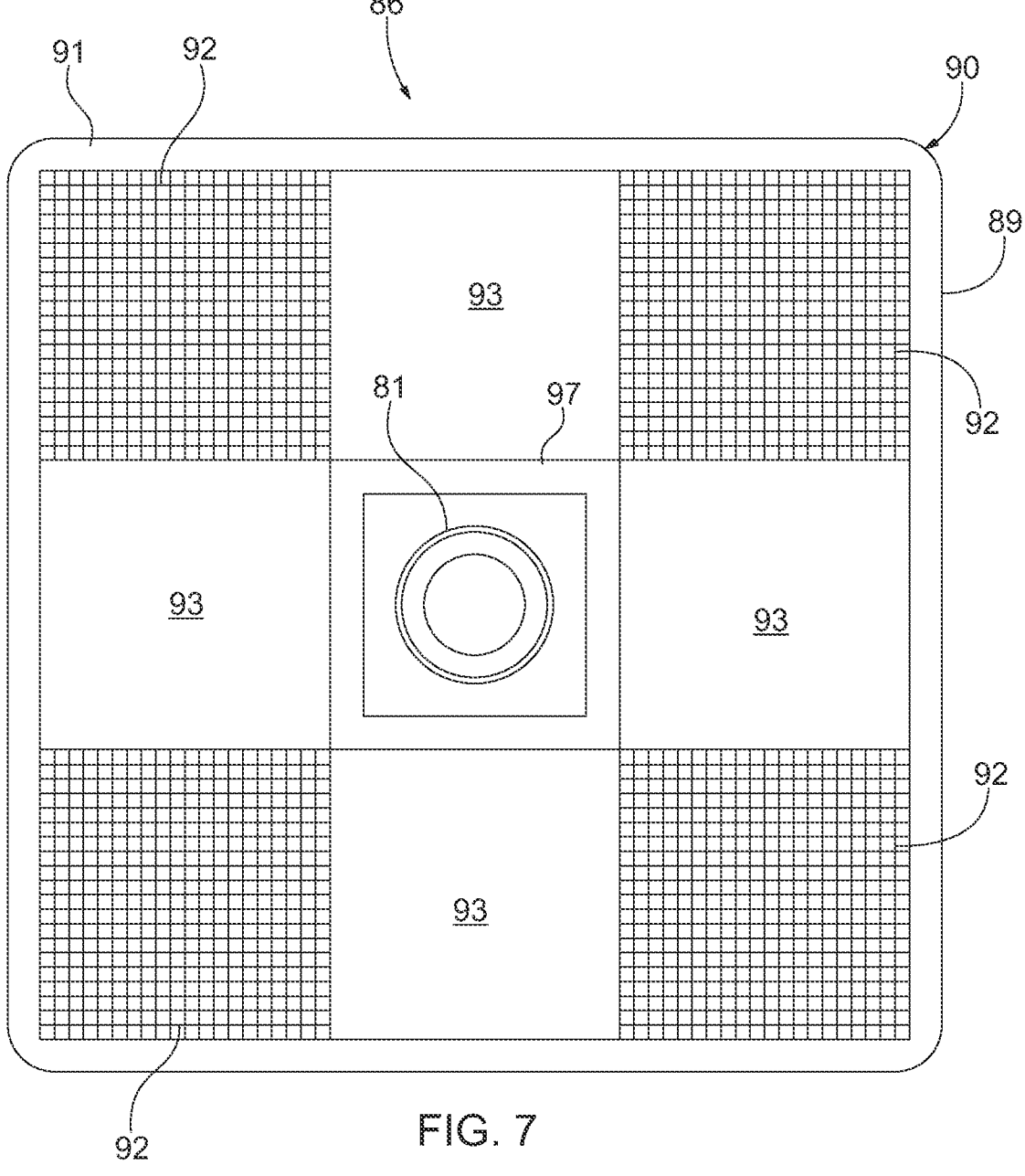
FIG. 7 is a bottom plan view of the air bearing system of FIG. 5.

FIG. 5 shows an air bearing carriage 86 of the present invention. Each air bearing carriage 86 includes a housing 89 secured to a corresponding pilot hangar shaft 81 of the transfer unit 62. The housing 89 has a bottom surface 90 being the bearing face. A raised lip 91 extends along the periphery of the bottom surface 90. The raised lip 91 is preferably ceramic plating but can be any other durable material with a similarly low co-efficient of friction. The bottom surface 90 includes a plurality of air pad surfaces 92 and non-air pad surfaces 93. Each air pad surface 92 includes a plurality of holes 94 fluidly connected to the air supply line 129 through which air is forced out. Pressurized air is supplied by the air compressor 127 and/or air tank 128 via the air supply line 129 up through the pilot hangar shaft 81, into the housing 89 and out of the holes 94 of the air pad surface 93. The supply of air through each air pad surface 92 may be independently controllable, and therefore one or more of the air pad surfaces may be supplied air while one or more air pad surfaces are not supplied air simultaneously on the same air bearing carriage 86. A view of the air bearing carriage along the bottom surface 90 is provided in FIG. 7.

In operation, the air compressor 127 and/or air tank 128 mounted on the frame 80 of the transfer unit 62 supplies pressurized air into an air supply line 129. The air supply line 129 sends the pressurized air to each of the four pilot hangar shafts 81 and up into the hollow housing 89 of the air bearing carriage 86 and downwardly out of the plurality of holes in the air pad surfaces 92. This flow of pressurized air is shown via arrows in FIG. 3B. The air compressor 127 and/or air tank 128 may be movable mounted to the frame 80 and may be positioned between shuttles 140.

The box beams 84 that form the grid track system include both longitudinally extending box beams 84a and transversely extending box beams 84b that are oriented at generally right angles with respect to one another. Both the longitudinally extending box beams 84a and transversely extending box beams 84b have lower inside surfaces 83a along the flanges 88 of each of the track sections that are engaged by the air pad surfaces 92 of the air bearing carriage 86 to lift the transfer unit 62 relative to the guide track system 60. A ceramic material layer 83, or similar low-friction material, may be laid along the flanges 88 of each box beam 84a, 84b and provide the lower inside surfaces. The material of layer 83 preferably is the same as the material of the raised lip 91 of the air bearing carriage 86.

Figure 9:
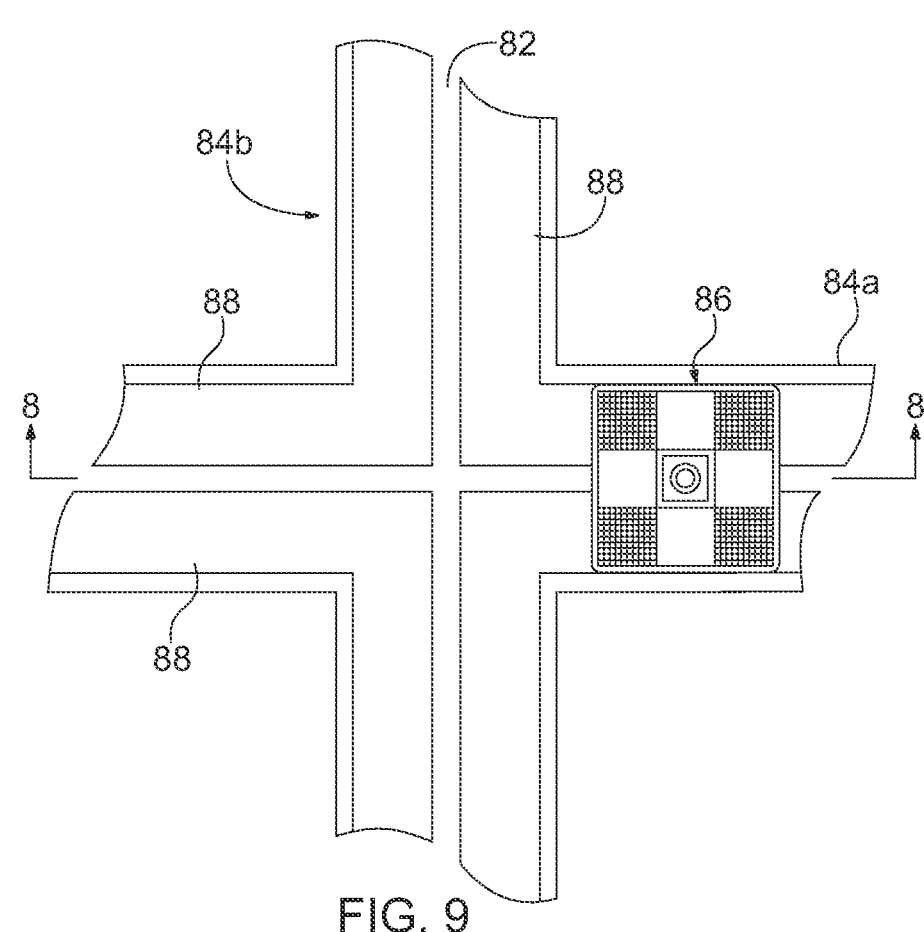
FIG. 9 is top view along plane B in FIG. 8 of the overhead guide tracks with the air bearing system.

Each air bearing carriage 86 of the transfer unit 62 is positioned within the box beams 84 along either longitudinally extending box beams 84a or transversely extending box beams 84b, as shown in FIGS. 8 and 9. The pilot hanger shaft 81 corresponding to each air bearing carriage 86, and attached to the transfer unit 62, extends downwardly from the bottom surface 90 and through the open slots 82 and between the flanges 88 on either side of the respective slot. The bottom surface 90 of each air bearing carriage faces the surface 83a along each flange 88 and the slot 82. The air pad surfaces 92 face the surface 83a along the respective flange 88 of the box beam 84, and at least two of the non-air pad surfaces 93 face the slot 82. When no air is being provided to the air bearing carriage 86, a bottom surface 91a of the raised lip 91 rests against the surface 83a of the flanges 88 of the box beam 84. When air is provided through the pilot hanger shaft 81 to the air pad surfaces 92, the pressurized air is directed downwardly through the holes 94 of one or more air pad surfaces. The downwardly directed air acts against surface 83a to lift the air pad carriage 86 relative to surfaces 83a and the flanges 88. This in turn raises the transfer unit 62 upwardly to hover just above surface 83a.

The raised lip 91 is shaped to help direct air flow to achieve lift of the air bearing carriage 86. The raised lip 91 extends completely around the periphery of the bottom surface 90 to help force the pressurized air downward and limit lateral escape of pressurized air. An inner raised lip 97 may also be provided along the bottom surface 90, within the raised lip 91, and around the shaft 81. The inner raised lip 97 may likewise be shaped to help direct air flow to achieve lift of the air bearing carriage 86. Together, the raised lip 91 and inner raised lip 97 form a continuous pocket or grove around the bottom surface 90.

The surfaces 91a and 97a of the raised lips 91 and 97 are ideally covered in or made from a low-friction material. Preferably, surfaces 83a and material layer 83 are made from the same low-friction material as surfaces 91a and 97a. Should the air bearing carriage lose air flow for some reason, e.g. mechanical failure or loss of power, the low-friction material of surfaces 91a, 97a and 83a will allow the air bearing carriage 86 to more easily slide along surfaces 83a and flanges 88 of the box beams 84.

Each air bearing carriage 86, and the corresponding transfer unit 62, is moved along a length of each box beam 84 by a linear motor system 150, which can be seen in FIGS. 8-12. The stator 152, or primary portion of the linear motor system 150, is fixed within each box beam 84 and extending along an upper surface 156 of each box beam in both longitudinally extending box beams 84a and transversely extending box beams 84b. A rotor 154, the movable secondary portion of the linear motor system 150, is provided along an upper surface 99 of the housing 89 of the air bearing carriage 86. The primary portion 152 creates a linear magnetic field through various generated electric currents supplied to primary portion. The secondary portion 154 attached to each air bearing carriage 86 contains magnets which interact with the linear magnetic field produced by the corresponding primary portion 152 to move all in the same direction along the hollow box beam 84. The electrical current and resulting linear magnetic field produced by the primary portion 152 of the linear motor system 150 can be reversed to move the secondary portions 154, and thus the transfer unit 62, in the opposite direction along the hollow box beams 84.

Figure 10:
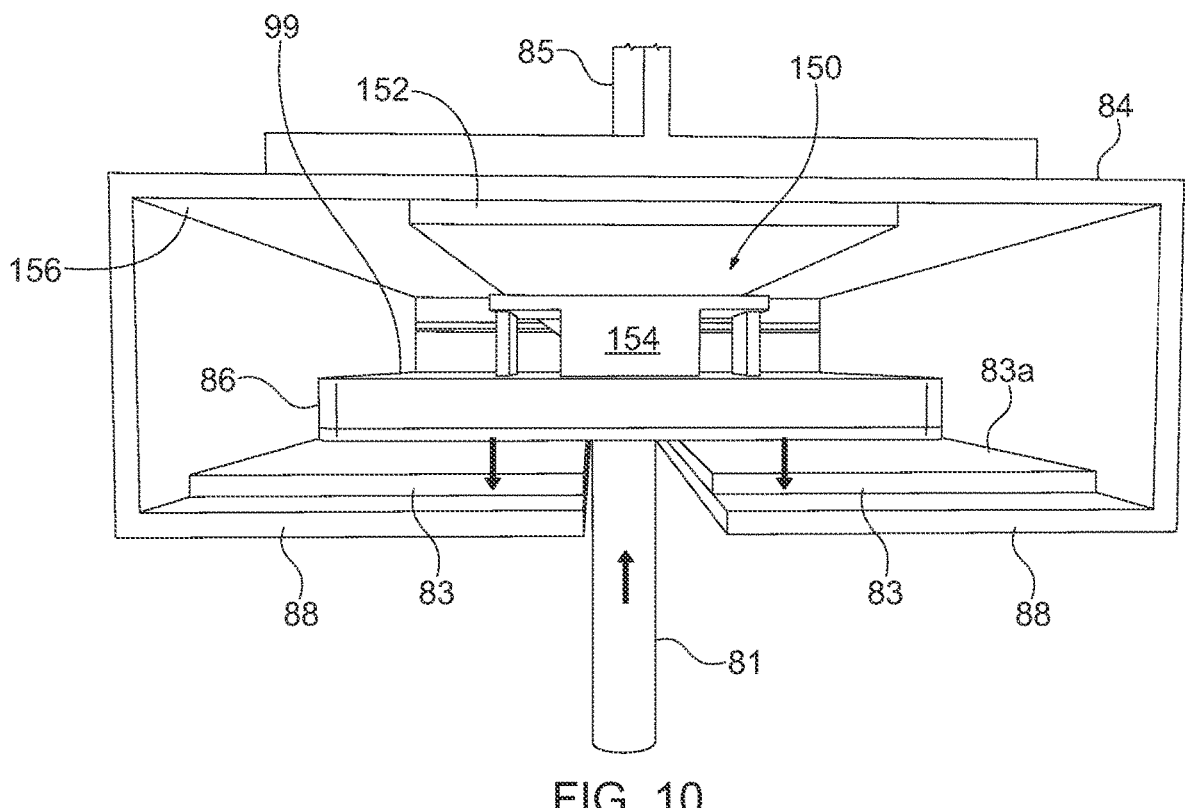
FIG. 10 is a lateral cross-sectional view of the overhead guide tracks with the air bearing system of FIG. 5 secured within the guide tracks.

As shown in FIG. 10, air flow is provided to the air bearing carriage 86 via the pilot hanger shafts 81 (upward arrow in FIG. 10) sufficient to lift the carriage relative to surface 83a (downward arrows in FIG. 10). Ideally, all air bearing carriages 86 of a transfer unit 62 are simultaneously lifted off surface 83a. As the air bearing carriages 86 of the transfer unit 62 account for vertical force upwards to lift the transfer unit relative to the flanges 88 and surface 83a of the box beams 84, the linear motor system 150 requires less applied force to move the transfer unit laterally long the lengths of the box beams 84a, 84b.

Figure 11:
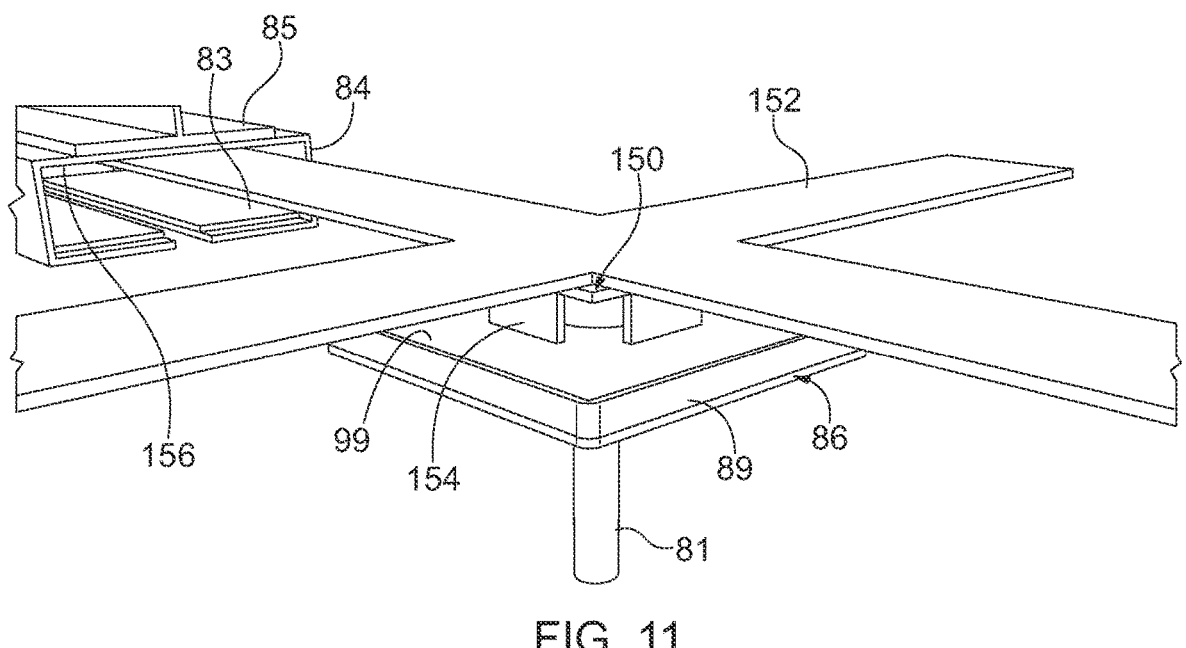
FIG. 11 is a perspective view of the air bearing system interacting with a linear motor system of the overhead guide track.

Movement of the air bearing carriages 86, and thus the corresponding transfer unit 62, along the length of each box beam 84a, 84b is achieved through actuation of the linear motor system 150. The primary portion 152 extends both longitudinally and transversely to match box beams 84a and 84b, as shown in FIG. 11. While there may be configurations of the invention that could allow the primary portion 152 to extend alongside walls of the box beams 84, it is preferable to have the primary portion to extend along the top surface 156 of the box beam. This ensures that the primary portion 152 extends continuously along the box beams 84. Any gaps in the primary portion 152, where the linear magnetic field could not be created or maintained along the box beams 84 could result in loss of movement of the air bearing carriage by the linear motor system 150 along the length of the box beams 84.

Figure 13:
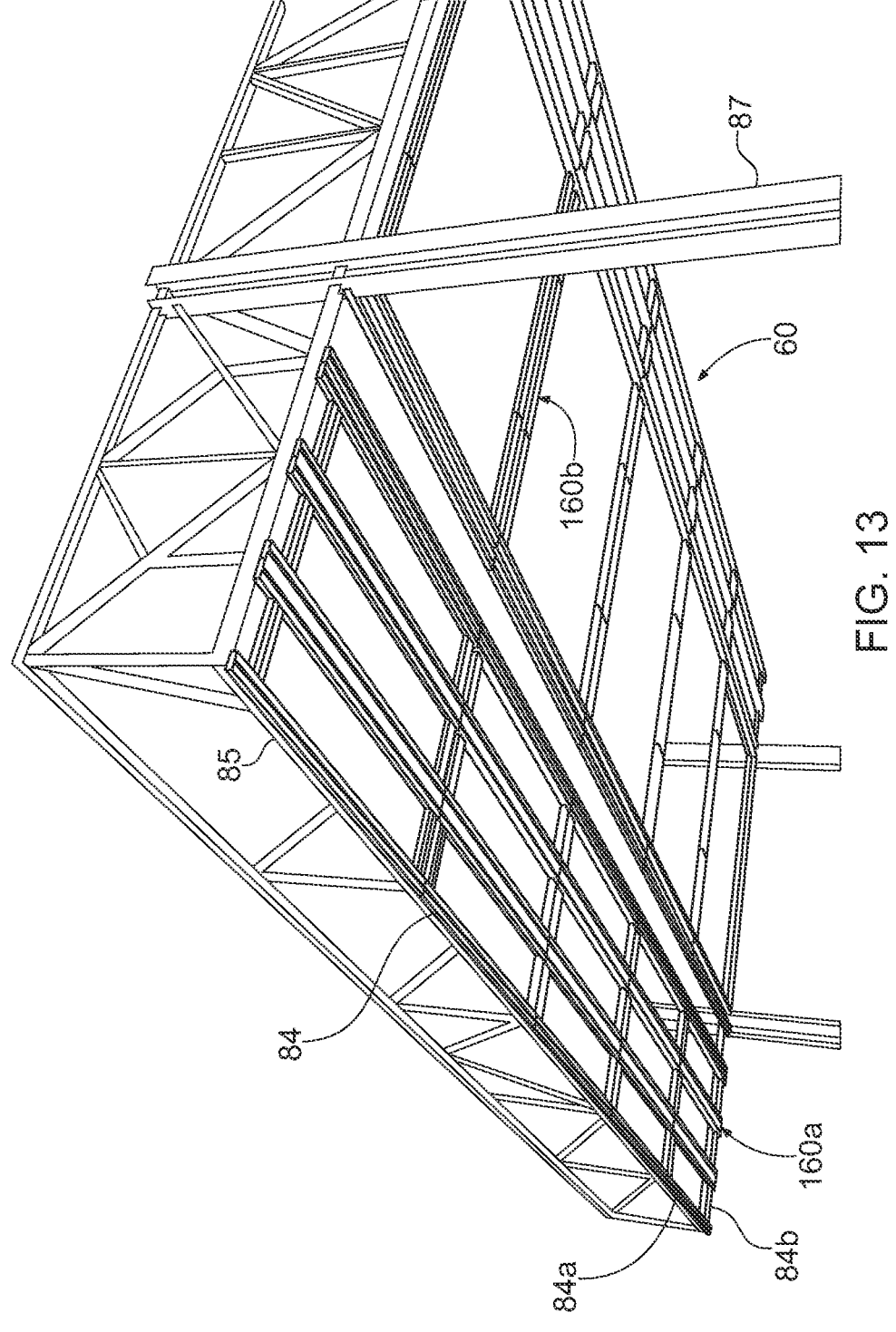
FIG. 13 is perspective view of the overhead guide track system, showing the double track sections which allow transfer units to maneuver around each other more efficiently.

FIG. 13 shows a preferred embodiment of the guide track 60 of the present invention. As previously discussed, vertical steel columns or posts 87 support and raise vertical steel beams 85 above the ground, and preferably high enough to interact with key or gantry cranes 25 and roller conveyors 41 or transfer platform vehicles 42 of platforms 40. The box beams 84 are attached to and underneath the vertical steel beams 85. The guide track system 60 of the present invention is separated from previous grid structures having transfer units 62 in that the system includes double rail sections 160, including both longitudinal double rail sections 160a and transverse double rail sections 160b oriented perpendicularly to each other. The double rail sections 160a, 160b include two box beams extending longitudinally side-by-side, or with minimal space between them. This configuration maximizes the area in which transfer units 62 can move and place containers within the guide track system 60. Further, the configuration maximizes efficiency of movement for transfer units 62 traveling via the guide track system 60.

Figure 14:
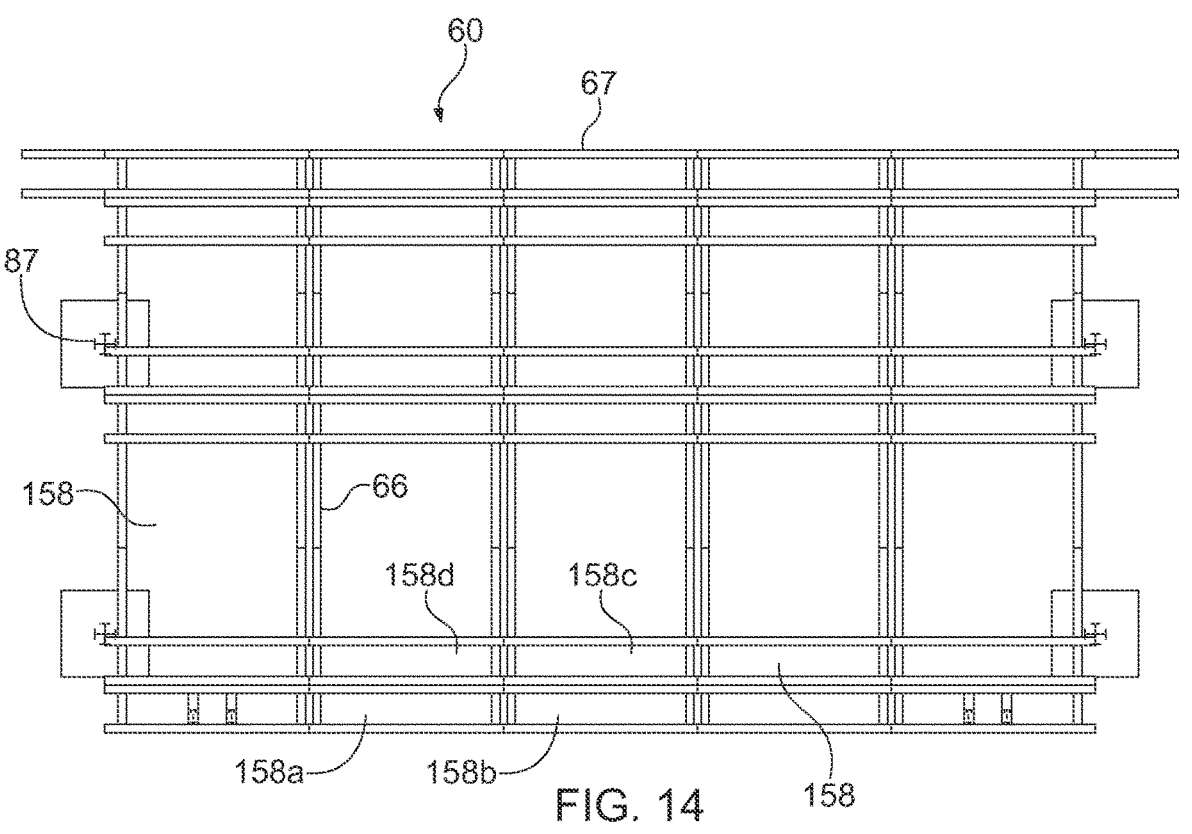
FIG. 14 is a top plan view of guide tracks of the overhead guide track system.

To better understand the improved efficiencies of the double rail sections 160, the overall guide track system 60 footprint and the grid cell 158 spacing should be considered. First, the footprint of the guide track system 60, as seen in the overhead view of FIG. 14, is identical to past guide track systems without double rail sections. In other words, the guide track system 60 with the addition of the double rail sections 160 takes up the same amount of space as previous guide track systems with the same number of grid cells 158, but drastically improves efficiency of the system.

The grid cell 158 is the footprint or overhead area between the nearest box beams 84a and 84b forming a parallelogram and corresponding to the overhead area of a transfer unit 62. In the preferred embodiment, shown in FIG. 14, the double rail sections 160 allow transfer units 62 to simultaneously operate or traverse adjacent grid cells 158. For example, a transfer unit 62 operating in grid cell 158a can operate simultaneously with another transfer unit operating in grid cell 158c. The transfer unit 62 in grid cell 158a can then move to grid cell 158b, while the transfer unit in grid cell 158c can move directly to grid cell 158d.

In a grid guide track system without double rail sections 160, but the same number of grid cells, transfer units could not operate in adjacent grid cells, as the air bearing carriages could not share the same box beam. Further, one transfer unit 62 would need to always maintain at least one grid cell 158 space in between another transfer unit while travelling. For example, the transfer unit 62 operating in grid cell 158a, in a conventional guide track system 60 without double rail sections 160, could not move into grid cells 158b, 158c, or 158d without another transfer unit first evacuating all grid cells 158 adjacent to the destination grid cell. Such a configuration can easily create a bottleneck in maneuvering transfer units 62 around each other, as well as reduce the total number of transfer units that could practically coexist on the same guide track system 60.

The box beams 84 of the double rail section 160, including either sections 160a or 160b, can be positioned immediately next to each other or may have a space 162 between the box beams. The distance between the box beams 84 of a double rail section 160 defining the lateral space 162 may vary. However, to maximize the number of transfer units 62 and area covered by the guide track system 60, it is preferable that the distance be as small as possible and at least smaller than the width of a transfer unit. Even more preferably, the distance is 10 cm or less.

Further, the grid track system 60 may include a combination of double rail sections 160, including both double rail sections 160a, 160b, and single sections of rails 66, 67, as shown in FIG. 14. The double rail sections 160 are particularly not necessary along the periphery of the grid track system 60.

As conventionally known, some embodiments the transfer unit 62 may be modified to permit the spreader beam 110 to be rotated through 360° to be able to universally adjust the orientation of a container C relative to a receiving surface, such as a trailer bed or flat car bed. To permit such movement, a lower platform may be connected below and to the frame 80 by way of a trunnion assembly. In this embodiment, the two hoist motors 112 and pairs of winding drums 114 are mounted to the lower platform. The trunnion assembly includes a circular rack having teeth that mesh with teeth of a beveled drive gear rotated by a trunnion motor mounted on the platform. The trunnion motor includes a reversible output drive shaft so that the lower platform may be rotated both clockwise and counterclockwise. The trunnion motor may also include an anti-back drive gear to lock the platform in position relative to the frame 80 whenever the trunnion motor is not being driven.

As conventionally known, the platform may be mounted to the frame 80 by secondary longitudinally and transversely extendable slide tracks associated with the frame and platform that permit the platform to be moved outwardly on at least three, and preferably all four sides, of the frame 80. Such a mounting arrangement permits a limited shifting or X-Y translation of a container C secured to the spreader beam or lifting frame 110 associated with the transfer unit 62.

The guide track system 60 and transfer units 62 of the present invention may be fully automated and interfaced with an inventory control system as conventionally known so that the location of each container C within the system is always known. By way of example, bar codes, RFID tags or other identification means may be placed on each container C and on each transfer unit 62. An inventory management center is provided that includes a radio signal transmitter. Utilizing directional frequency transmissions, remote tags are located within the system. The tags not only include information as to the identity of the container C but may include information concerning the contents, the identity of the shipper and of the receiver as well as any other information that may be of interest to port or transportation personal, government authorities and others. Once a transfer unit 62 is secured to a container C through the spreader beam 110, a control computer within the management center will follow the movement of both the container and the transfer unit. In some instances where it is known that a particular container being off loaded from a container ship is to be transported by an identified ground transporter, such as a truck or train, the container may be moved directly from the ship or transfer platform 40 to an awaiting truck or rail car or moved to a loading dock area 136 where the contents 137 of a container may be separated for shipment in smaller volumes. In instances where containers are to be off loaded from a ship or from a ground transportation source and placed into storage for future shipment, information is communicated to the transfer units 62 to move the containers to specific locations within the system, such as a given stacking area within the open storage area(s) or the warehouse(s).

In addition to the foregoing, in some embodiments and as conventionally known, the transfer units 62 being remotely controlled may include transceivers for communicating with the central control system or inventory management center of the port, however, in other instances, the transfer units may be controlled from a remote location using radio frequency technology, Global Positioning Technology (GPS) and the like.

In addition to remote communications control of the movement and location of the transfer units and containers of the invention, sensors and the like may be affiliated with the motors, winches, drive gears and the like of the invention to monitor the exact location of the vehicles and containers, as conventionally known. Digital input from drive motor rotations and registration at digitized check points along the grid system or at each cell location within a ship or within a storage area or warehouse may also provide information relating to the movements of the transfer units 62 within the guide track system 60. The hoist motors 112 may also have digitized features for determining the exact elevation and relationship of the transfer beams 110 to each transfer unit 62 when raising and lowering a container C. The drive motors 112 may be controlled by master encoders and synchronizing slave encoders with X-Y position sensors located within the grid track system for position identification and/or verification.

As conventionally known for security purposes, before the containers C are allowed to be placed into storage or moved from one form of transport to another, the containers are moved adjacent one of the scanning devices at which time the contents of the containers are scanned and compared or matched against computerized bills of lading to verify the contents of the containers and to prevent the movement of illegal or hazardous goods and/or devices. As the scanners are located at elevated locations along the grid track system, the containers do not have to be cyclically raised and lowered. The overhead grid guide track system is specifically designed to eliminate repetitive container transfers between numerous container handlers and to minimize vertical container movement to reduce the time of movement of the containers within the system from one point to another.

In the event the contents of a scanned container appear to be suspicious, the port system of the invention may also include an inspection station as conventionally known where a questionable container can be placed, and the contents thereof inspected by port officials. Once a container is cleared by inspection, the container may be transferred to storage or to an appropriate transport vehicle or ship.

Utilizing the system of the invention, a designated container may be automatically located within a warehouse, storage area or ship=s hold and containers above the designated container may be moved appropriately and, thereafter, relocated once the designated container has been retrieved utilizing the transfer units and their hoist mechanisms.

Once a designated container is located on board a ship it may be selectively elevated and positioned for retrieval from the hold utilizing one of the transfer vehicles associated with the bridge crane as previously described. Loading of the ship=s hold can also be fully automatic with each container being placed at a predetermined location within the hold as containers that are placed on the elevated transfer platform are loaded into the ship=s hold.

Using the systems of the invention, it is envisioned that ships can be loaded and unloaded simultaneously to reduce the time a ship must remain at dockside almost in half. Also, multiple transfer units 62 can pre-stage shipping containers in such a way they are positioned closest to their outbound area (truck, rail, ship) in predetermined order to hasten loading onto the mode of transportation (truck, rail, ship). The transfer units can be off lined in case of breakdown, while the other transfer units continue to transfer the shipping containers. Additionally, the storage area can be divided into an inbound area in the middle, which is empty initially, while the outbound containers are pre-staged to be worked from the inside out, towards the outside of each pre-stage area for truck, rail and ship movement.

The foregoing description of the preferred embodiment of the invention has been presented to illustrate the principles of the invention and not to limit the invention to the embodiment illustrated. It is intended that the scope of the invention be defined by all the embodiments encompassed within the following claims and their equivalents.

We claim:

1. A shipping container storage and distribution system, comprising:

an overhead grid guide track structure including a plurality of box beams extending transversely with respect to one another in an intersecting pattern, at least one transfer unit moveably mounted to the grid guide track structure so as to be suspended from at least two spaced and parallel first box beams of the plurality of box beams when moving along a first axis and at least two spaced and parallel second box beams of the plurality of box beams when moving along a second axis transverse to the first axis, one or more transfer units of said at least one transfer unit including a plurality of carriages for suspending the one or more transfer units from said at least two first box beams and said at least two second box beams, the one or more transfer units further including one or more air compressors secured to a frame, wherein each carriage of the plurality of carriages is connected to an air compressor of said one or more air compressors, each said carriage of the plurality of carriages having an air bearing capable of moving the carriage in a longitudinal and transverse directions without changing an orientation of the carriage within the box beam, each said carriage including a bearing housing with a plurality of openings along a bottom surface of the bearing housing, the air compressor configured to supply pressurized air to the bearing housing via a corresponding shaft of the central frame such that the pressurized air is forced out of the plurality of openings, a linear motor system having a stator and at least one rotor, the stator extending throughout the plurality of box beams, and a rotor of said at least one rotor attached to said each carriage of the plurality of carriages of the one or more transfer units, the linear motor system configured to move the one or more transfer units of said at least one transfer unit along said plurality of box beams of said grid guide track structure so as to be moveable in a horizontal plane in both forward-and-backwards and side-to side-motions within the plane.

2. The shipping container storage and distribution system of claim 1, further comprising:

a transfer platform attached to or synchronized with a ship-to-shore crane; and a transfer platform vehicle upon which a container from the ship-to-shore crane is placed and transferred to the overhead grid guide track structure.

3. The shipping container storage and distribution system of claim 2, wherein the transfer platform vehicle is supported on air bearings and electrically or pneumatically driven by wheels or linear induction motors to move the transfer platform vehicle from a location where the ship-to-shore crane delivers the container from a ship to underneath the overhead grid guide track structure.

4. The shipping container storage and distribution system of claim 1, wherein each said transfer unit of said at least one transfer unit includes two shuttles, each shuttle of the two shuttles containing two hoists, secured to a central frame of the transfer unit and a spreader beam, the spreader beam being expandable or retractable to align with four corners of the container whereby the two shuttles vertically align hoist cables connecting the spreader beam and the two hoists of each said shuttle of the two shuttles when the spreader beam is attached to the container at four upper corners of the container.

5. The shipping container storage and distribution system of claim 4, wherein each said shuttle of the two shuttles is configured such that the shuttle can move longitudinally back and forth within a central frame of the transfer unit to position the hoist cables attached to the spreader beam.

6. The shipping container storage and distribution system of claim 4, wherein each said shuttle of the two shuttles is configured such that the shuttle can move longitudinally back and forth within a central frame of the transfer unit to position the container when attached to the spreader beam.

7. The shipping container storage and distribution system of claim 4, wherein the two shuttles are movable with respect to the central frame when the spreader beam is secured to the container to maintain a 90-degree angle between cables securing the two hoists within each said shuttle of the two shuttles to the spreader beam and the container.

8. The shipping container storage and distribution system of claim 1, wherein each said transfer unit of said at least one transfer unit further comprises:

the central frame having a plurality of shafts, each shaft of the plurality of shafts extending vertically upward and attached to a carriage of the plurality of carriages;

one or more hoist motors secured to the frame;

one or more winding drums connected to and rotatable by the one or more hoist motors;

a cable attached to each winding drum of the one or more winding drums, the cable extendable and retractable relative to the frame; and a spreader beam secured to the cable of said each winding drum.

9. The shipping container storage and distribution system of claim 8, wherein said one or more air compressors, said one or more hoist motors, and said one or more winding drums are all secured to a movable frame secured to and movable in relation to the central frame.

10. The shipping container storage and distribution system of claim 9, wherein each movable frame is secured to the central frame via rack and pinion system.

11. The shipping container storage and distribution system of claim 1, wherein each said carriage of the plurality of carriages further comprises:

a carriage housing having an upper surface and a lower surface, the carriage housing attachable to a shaft along at least the lower surface;

a raised lip along a periphery of the lower surface, the raised lip extending downwardly and away from the lower surface;

a plurality of air pad surfaces along the lower surface and within the raised lip, each air pad surface of the plurality of air pad surfaces having at least one hole;

wherein the at least one hole is fluidly connected through the carriage housing to the shaft such that air may be passed through the shaft, through the housing, and out through the at least one hole.

12. The shipping container storage and distribution system of claim 1, wherein each said transfer unit of said at least one transfer unit has a spreader beam extendable between different lengths to accommodate containers of different sizes.

13. The shipping container storage and distribution system of claim 1, wherein each first box beam of said at least two spaced and parallel first box beams of the plurality of box beams and each second box beam of said at least two spaced and parallel second box beams of the plurality of box beams has two flanges along a bottom surface defining a central slot.

14. The shipping container storage and distribution system of claim 13, wherein each said carriage of the plurality of carriages is positioned within either the first box beam of said at least two spaced and parallel first box beams of the plurality of box beams or a second box beam of said at least two spaced and parallel second box beams of the plurality of box beams such that a bottom surface of each said carriage is configured to interact with an inner surface of each flange of the two flanges.

15. The shipping container storage and distribution system of claim 14, wherein the air bearing of each said carriage of the plurality of carriages is located on the bottom surface of each said carriage of the plurality of carriages and is configured to lift the carriage of the plurality of carriages relative to the two flanges when air is forced out of the air bearing.

16. The shipping container storage and distribution system of claim 15, wherein a bottom surface of each said carriage of the plurality of carriages has a raised outer lip extending along a periphery of the bottom surface.

17. The shipping container storage and distribution system of claim 16, wherein the bottom surface of each said carriage of the plurality of carriages has a raised inner lip extending around a pilot hanger shaft connecting the carriage to a corresponding transfer unit of the plurality of transfer units.

18. The shipping container storage and distribution system of claim 17, wherein a plurality of air pad surfaces are positioned along the bottom surface of each said carriage of the plurality of carriages and within the raised outer lip, each air pad surface of the plurality of air pad surfaces having a plurality of holes.

19. The shipping container storage and distribution system of claim 18, wherein the stator of the linear motor extends along an upper inner surface of each said first box beam of said at least two spaced and parallel first box beams of the plurality of box beams and each said second box beam of said at least two spaced and parallel second box beams of the plurality of box beams.

20. The shipping container storage and distribution system of claim 19, wherein each rotor of the plurality of rotors of the linear motor per said transfer unit of said at least one transfer unit is positioned on an upper surface of a corresponding carriage of the plurality of carriages.

* * * * *